(12) United States Patent
Rao et al.

(10) Patent No.: US 8,805,649 B2
(45) Date of Patent: Aug. 12, 2014

(54) METHODS FOR ANTI-COLLISION AND MULTIPLE ACCESS IN RFID COMMUNICATIONS

(75) Inventors: Samantha Rao, Bangalore (IN); Ertugrul Berkcan, Clifton Park, NY (US); Emad Andarawis, Ballston Lake, NY (US); Eladio Delgado, Burnt Hills, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1152 days.

(21) Appl. No.: 12/365,844

(22) Filed: Feb. 4, 2009

(65) Prior Publication Data

US 2010/0198560 A1 Aug. 5, 2010

(51) Int. Cl.
*G06F 15/00* (2006.01)
*G08B 1/08* (2006.01)

(52) U.S. Cl.
USPC ........................................ 702/188; 340/539.1

(58) Field of Classification Search
USPC ......................................................... 702/188
See application file for complete search history.

(56) References Cited

U.S. PATENT DOCUMENTS

| 5,583,819 | A |   | 12/1996 | Roesner et al. |
| 5,986,570 | A | * | 11/1999 | Black et al. ................ 340/10.2 |
| 6,091,319 | A |   | 7/2000  | Black et al. |
| 6,265,962 | B1 |   | 7/2001 | Black et al. |
| 6,411,199 | B1 |   | 6/2002 | Geiszler et al. |
| 7,079,034 | B2 |   | 7/2006 | Stilp |
| 2002/0154029 | A1 | * | 10/2002 | Watters et al. ........... 340/870.07 |
| 2003/0128681 | A1 | * | 7/2003 | Rauschmayer .............. 370/338 |

(Continued)

FOREIGN PATENT DOCUMENTS

| WO | 9912122 A1 | 3/1999 |
| WO | 9967735 A1 | 12/1999 |

(Continued)

OTHER PUBLICATIONS

Abstract for WO03/107266, espacenet, May 5, 2009, 1 page.

*Primary Examiner* — Janet Suglo
*Assistant Examiner* — Michael Dalbo
(74) *Attorney, Agent, or Firm* — Bracewell & Giuliani LLP

(57) ABSTRACT

A monitoring system for monitoring one or more operating conditions of a structure such as an aircraft, method of operating a system for monitoring one or more operating conditions of the structure, and a sensor node for use in a monitoring system for monitoring one or more operating conditions of the structure, are provided. An example of a monitoring system can include a plurality of sensor nodes coupled to the structure and a controller for monitoring the sensor nodes. Each sensor node can include a communications interface including memory storing a plurality of sensor node communication protocol attributes used for communicating with the controller.

36 Claims, 22 Drawing Sheets

(56) References Cited

U.S. PATENT DOCUMENTS

| | | |
|---|---|---|
| 2005/0092838 A1 | 5/2005 | Tsirline et al. |
| 2005/0122999 A1* | 6/2005 | Scherzer et al. ............... 370/480 |
| 2005/0129055 A1* | 6/2005 | Hall et al. ..................... 370/461 |
| 2005/0233699 A1* | 10/2005 | Tegreene ...................... 455/63.4 |
| 2005/0248454 A1* | 11/2005 | Hanson et al. ........... 340/539.26 |
| 2006/0198346 A1* | 9/2006 | Liu et al. ...................... 370/338 |
| 2006/0239333 A1* | 10/2006 | Albert et al. .................. 375/130 |
| 2006/0258292 A1* | 11/2006 | Kato et al. ................. 455/67.11 |
| 2007/0067742 A1* | 3/2007 | Takaoka et al. ............... 715/850 |
| 2007/0080797 A1* | 4/2007 | Jung et al. .................... 340/500 |
| 2007/0114422 A1* | 5/2007 | Berkcan et al. ............. 250/358.1 |
| 2007/0118335 A1* | 5/2007 | Andarawis et al. ........... 702/188 |
| 2008/0252445 A1* | 10/2008 | Kolen ....................... 340/539.16 |
| 2009/0207769 A1* | 8/2009 | Park et al. ..................... 370/311 |
| 2010/0049377 A1* | 2/2010 | Scheid et al. ..................... 701/3 |

FOREIGN PATENT DOCUMENTS

| | | |
|---|---|---|
| WO | 0073990 A1 | 12/2000 |
| WO | 03107266 A1 | 12/2003 |
| WO | 2005001744 A2 | 1/2005 |
| WO | 2005008575 A1 | 1/2005 |

\* cited by examiner

METHODS FOR ANTI-COLLISION AND MULTIPLE ACCESS IN RFID COMMUNICATIONS

CROSS-REFERENCE TO RELATED APPLICATIONS

This application is related to U.S. patent application Ser. No. 12/208,222, filed on Sep. 10, 2008, the disclosure of which is incorporated herein by reference.

BACKGROUND

This disclosure relates to monitoring systems for aircraft.

BRIEF DESCRIPTION OF THE DRAWINGS

FIG. 3b is a schematic illustration of an exemplary embodiment of the non-volatile memory of the communication link of FIG. 3a.

DETAILED DESCRIPTION

Figure 1:
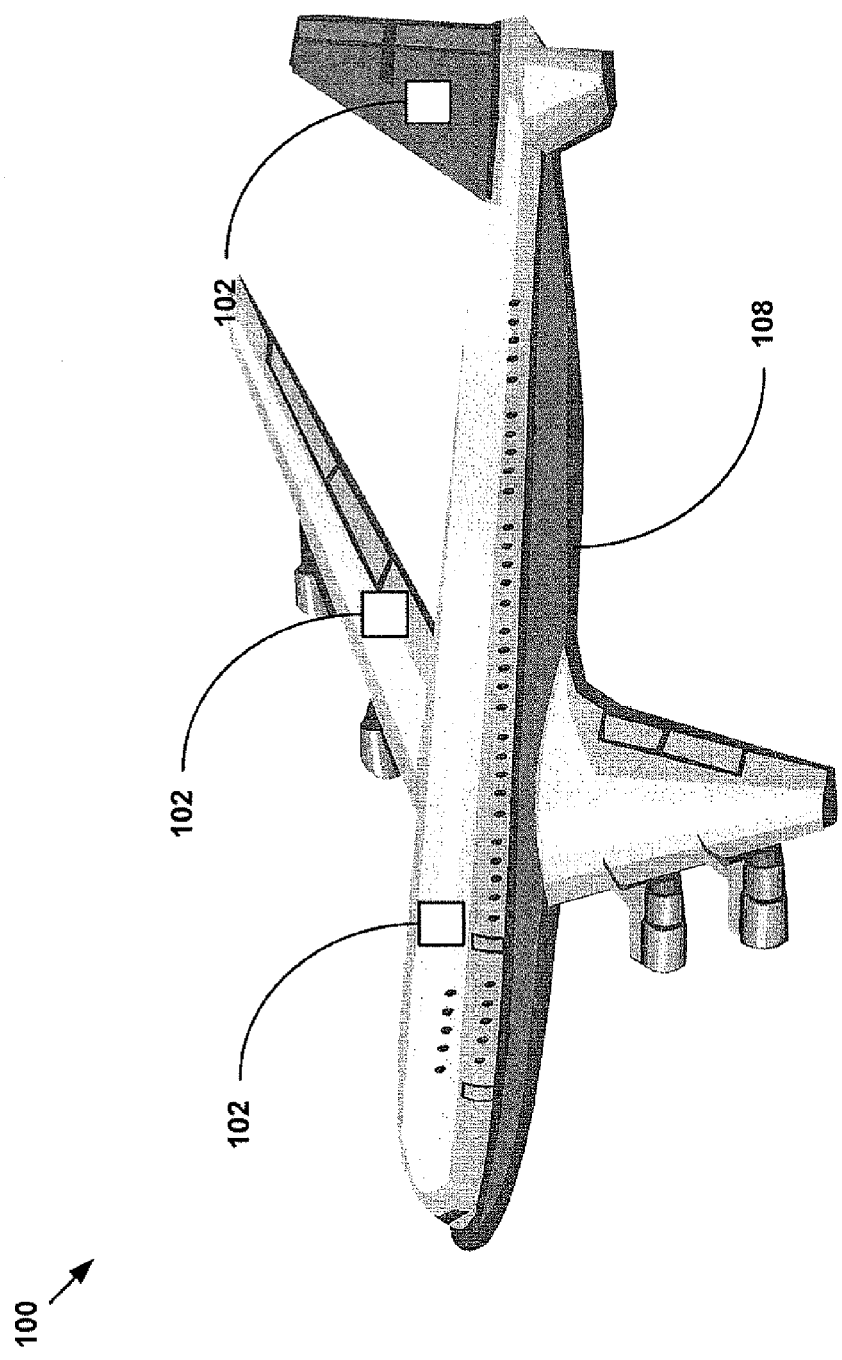
FIG. 1 is an illustration of an exemplary embodiment of an aircraft monitoring system.
Figure 2:
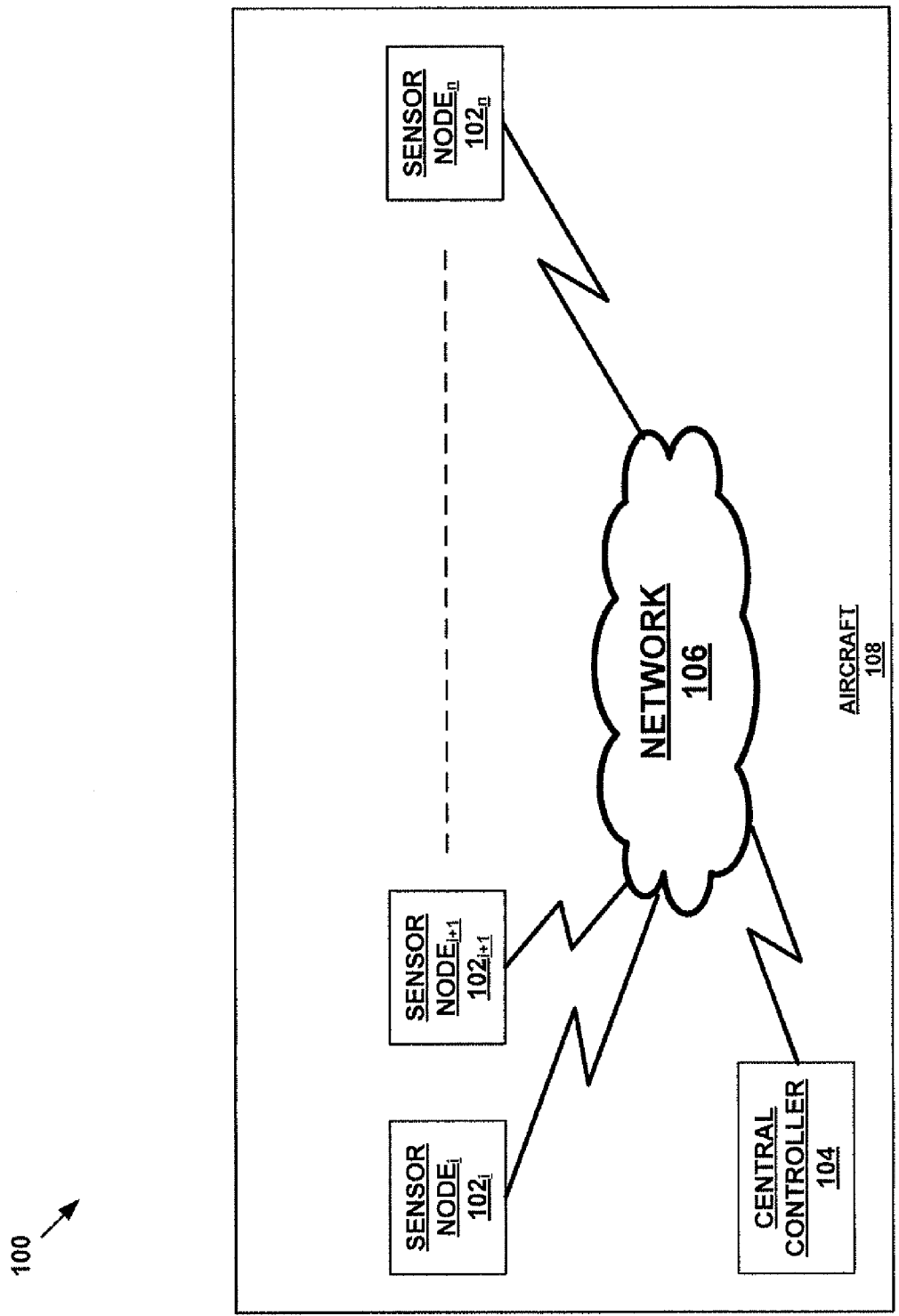
FIG. 2 is a schematic illustration of the aircraft monitoring system of FIG. 1.

In the drawings and description that follows, like parts are marked throughout the specification and drawings with the same reference numerals, respectively. The drawings are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results. The various characteristics mentioned above, as well as other features and characteristics described in more detail below, will be readily apparent to those skilled in the art upon reading the following detailed description of the embodiments, and by referring to the accompanying drawings.

Referring to FIGS. 1-3, 3a, 3b, 3c, 3d and 3e, an exemplary embodiment of a system 100 for monitoring an aircraft includes one or more sensors nodes 102 that are operably coupled to a central controller 104 by a network 106. In an exemplary embodiment, the sensor nodes 102 are distributed within an aircraft 108 for monitoring one or more operational states of the aircraft that may, for example, include stresses, strains, temperatures, and pressures. In an exemplary embodiment, one or more of the sensor nodes 102 communicate the operational states of the aircraft 108 to the central controller 106 that is housed within the aircraft using, for example, a network 106 that may, for example, include a hard wired, fiber optic, infra red, radio frequency, or other communication pathway.

In an exemplary embodiment, each sensor node 102 includes a power supply 102a that is adapted to scavenge energy from the immediate environment. In an exemplary embodiment, the power supply 102a may, for example, scavenge electromagnetic energy, vibrational energy, heat energy, and/or wind energy from the immediate environment. In an exemplary embodiment, the power supply 102a is operably coupled, and supplies power, to at least one communication link 102b, a switch 102c, a micro-controller 102d, a signal conditioner 102e, a sensor 102f, a switch 102g, and a switch 102h.

In an exemplary embodiment, the communication link 102b is also operably coupled to the switch 102c and adapted to transmit and receive communication signals between the sensor node 102 and the network 106. In this manner, the sensor node 102 may communicate with other sensor nodes and the central controller 104.

In an exemplary embodiment, the switch 102c is also operably coupled to the communication link 102b and the micro-controller 102d and adapted to be controlled by the micro-controller to thereby communications between the communication link and the micro-controller. In this manner, in the event that the micro-controller 102d determines that communication should not occur between the communication link 102b and the micro-controller such as, for example, if the sensor node 102 lacks sufficient power, the micro-controller may operate the switch to prevent communication between the communication link and the micro-controller. In an exemplary embodiment, the switch 102c may, for example, be a mechanical, electrical, or a logical switch.

In an exemplary embodiment, the micro-controller 102d is also operably coupled to the communication link 102b, the switch 102c, the signal conditioner 102e, the sensor 102f, and the switch 102g for monitoring and controlling the operation of each. In an exemplary embodiment, the micro-controller 102d may include, for example, a conventional general purpose programmable controller.

In an exemplary embodiment, the signal conditioner 102e is also operably coupled to the micro-controller 102d and the sensor 102 and adapted to condition signals transmitted by the sensor before they are further processed by the micro-controller. In an exemplary embodiment, the signal conditioner 102e may, for example, include one or more conventional signal processing elements such as, for example, filters, amplifiers, and analog to digital converters.

In an exemplary embodiment, the sensor 102f is also operably coupled to the signal conditioner 102e and the switch 102g and adapted to sense one or more operating conditions of the aircraft 108 in the immediate environment. In an exemplary embodiment, the sensor 102f may include, for example, one or more of the following: a strain gauge, a stress sensor, a temperature gauge, a pressure gauge, an radiation detector, a radar detector, and/or a detector of electromagnetic energy.

In an exemplary embodiment, the switch 102g is also operably coupled to the micro-controller 102d and the sensor 102f and adapted to control the operation of the sensor under the controller of the micro-controller. In this manner, in the event that the micro-controller 102d determines that the sensor 102f should not operate such as, for example, if the sensor node 102 lacks sufficient power, the micro-controller may operate the switch 102g to prevent power from being supplied by the power supply 102a to the sensor.

In an exemplary embodiment, the switch 102h is also operably coupled to the micro-controller 102d and the communication link 102b and adapted to control the operation of the communication link under the controller of the micro-controller. In this manner, in the event that the micro-controller 102d determines that the communication link 102b should not operate such as, for example, if the sensor node 102 lacks sufficient power, the micro-controller may operate the switch 102h to prevent power from being supplied by the power supply 102a to the communication link.

Figure 3:
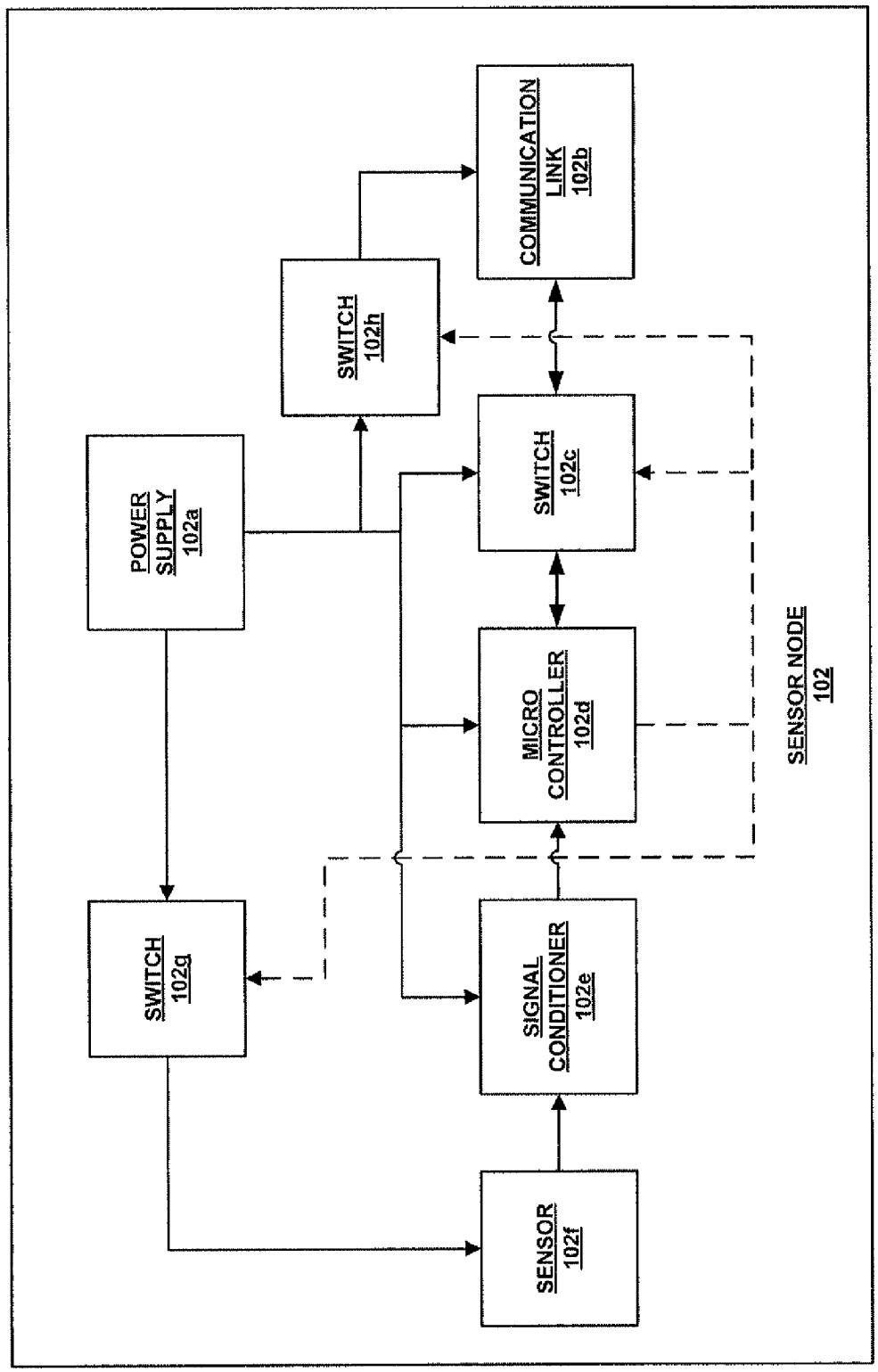
FIG. 3 is a schematic illustration of an exemplary embodiment of sensor nodes of the aircraft monitoring system of FIG. 2.
Figure 3A:
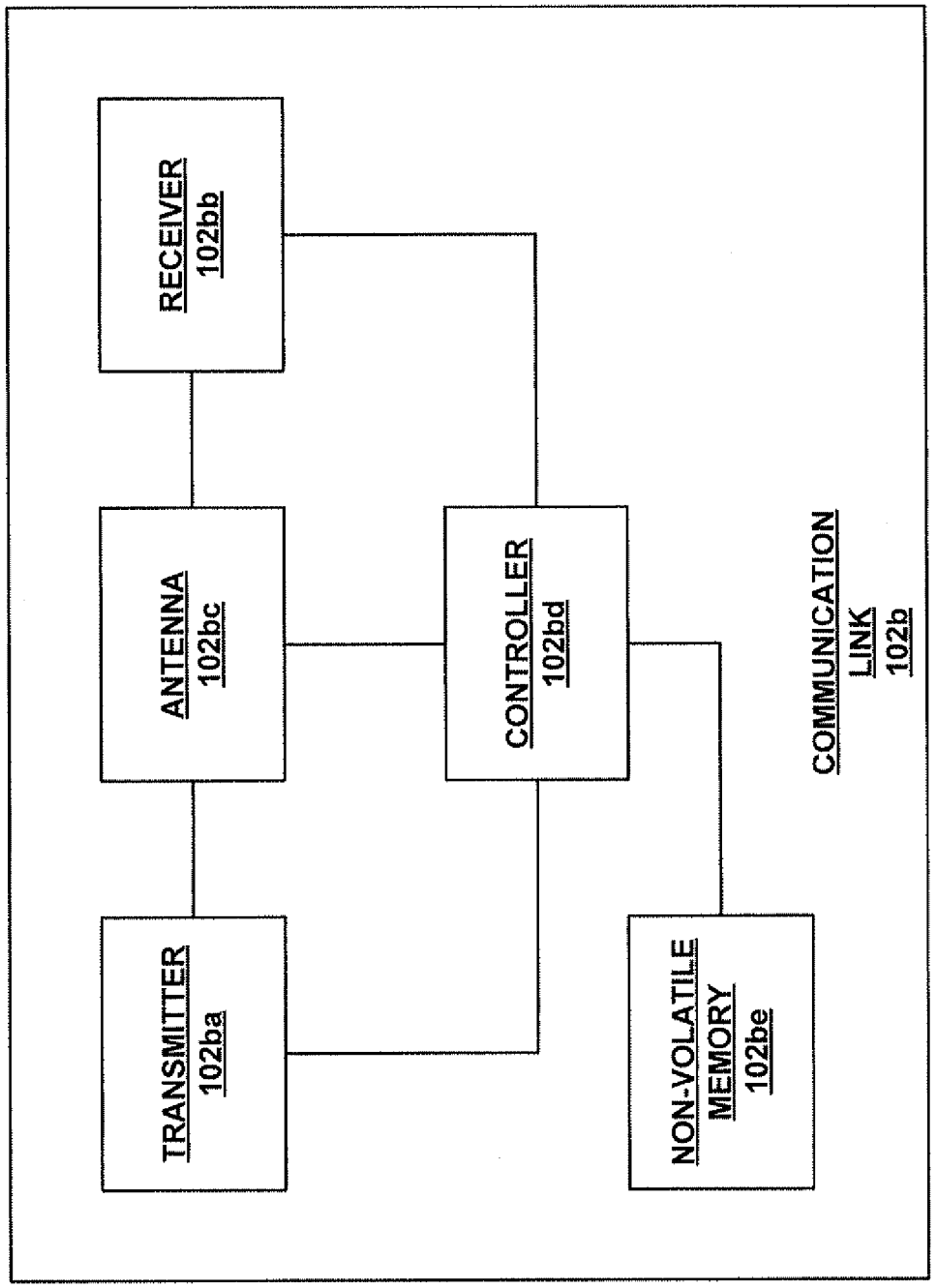
FIG. 3a is a schematic illustration of an exemplary embodiment of the communication link of the sensor nodes of FIG. 3.

In an exemplary embodiment, as illustrated in FIG. 3a, the communication link 102b of the sensor node 102 includes a transmitter 102ba and a receiver 102bb that are both operably coupled to an antenna 120bc. A controller 102bd is also operably coupled to the transmitter 102ba, the receiver 102bb, the antenna 102bc and a non-volatile memory 103be. In an exemplary embodiment, the transmitter 102ba, the receiver 102bb and the antenna 102bc may be conventional. In an exemplary embodiment, the antenna 102bc may be a conventional directional antenna. In this manner, communication between the sensor node 102 and other sensor nodes and/or the central controller 104 may be implemented using a space division multiplexing ("SDM") operating mode thereby preventing collisions between communications. In an exemplary embodiment, the controller 102bd may be, for example, a conventional general purpose programmable controller and/or an application specific integrated circuit and/or an analog controller. In an exemplary embodiment, the non-volatile memory 102be may be a conventional non-volatile memory device such as, for example, a flash memory or FAST RAM.

Figure 3B:
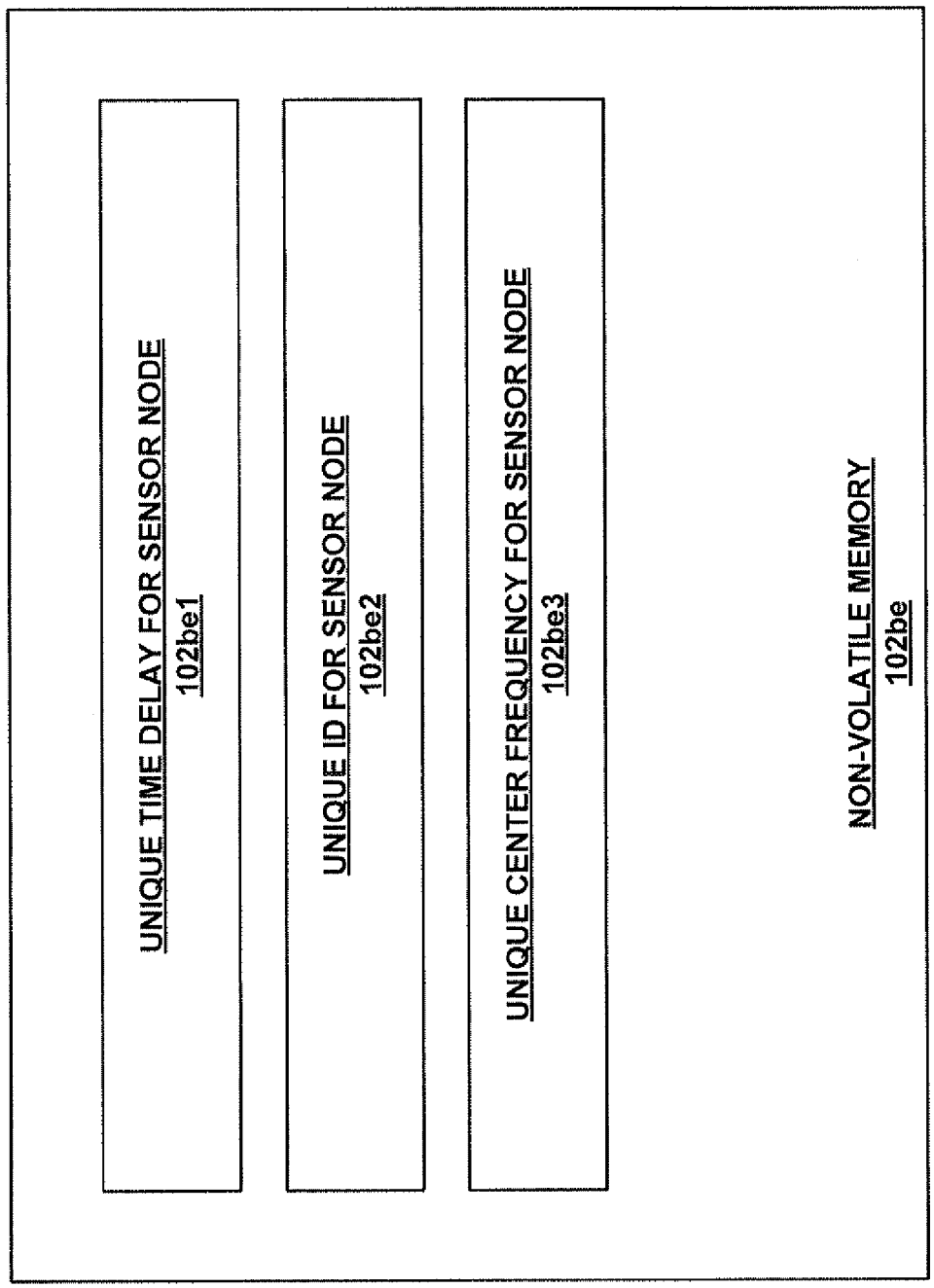

In an exemplary embodiment, as illustrated in FIG. 3b, the non-volatile memory 102be may include a time delay record 102be1 having a value that is representative of a unique time delay associated with the transmission of data from the sensor node 102 to one or more other sensor nodes and/or the central controller 104, a unique identication ("ID") 102be2 associated with the sensor node, and a unique carrier frequency 102be3 associated with the transmission of data from the sensor node 102 to one or more other sensor nodes and/or the central controller.

In an exemplary embodiment, each of the sensor nodes 102 have a unique time delay 102be1. In this manner, communications between the sensor nodes 102 and other sensor node and/or the central controller 104 may employ a time division multiplexing ("TDM") mode of operation thereby preventing collisions between communications. In an exemplary embodiment, each of the sensor nodes 102 include a unique ID 102be2. In this manner, communications from each of the sensor nodes may be uniquely identified. In an exemplary embodiment, each of the sensor nodes 102 include a unique carrier frequency 102be3 associated with the transmission of data from the sensor node 102. In this manner, communications between the sensor nodes 102 and other sensor node and/or the central controller 104 may employ a frequency division multiplexing ("FDM") mode of operation thereby preventing collisions between communications.

Figure 3C:
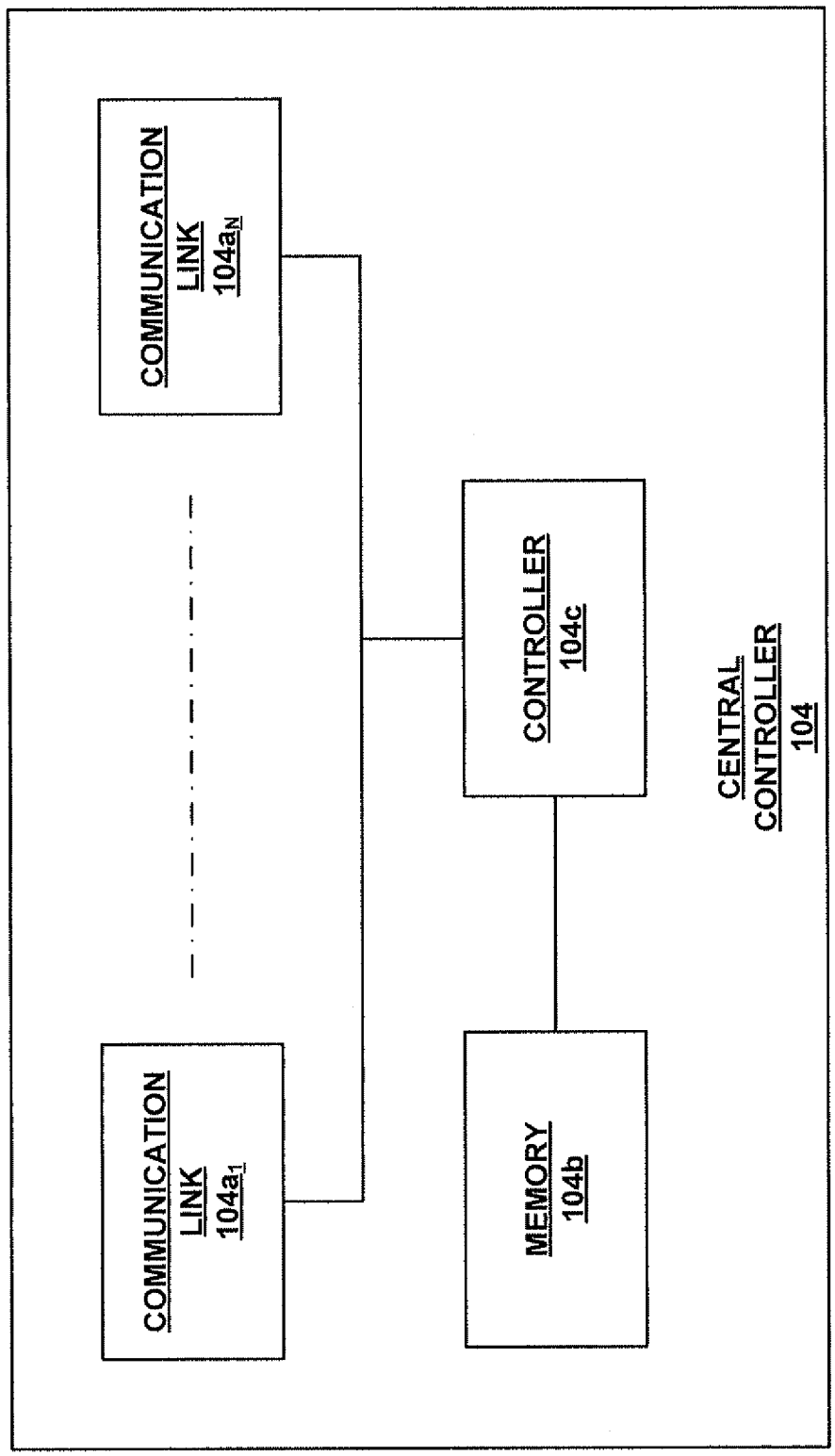
FIG. 3c is a schematic illustration of an exemplary embodiment of the central controller of the aircraft monitoring system of FIG. 2.

Referring now to FIG. 3c, in an exemplary embodiment, the central controller 104 includes one or more communication links 104a and a conventional memory 104b that are operably coupled to a conventional controller 104c.

Figure 3D:
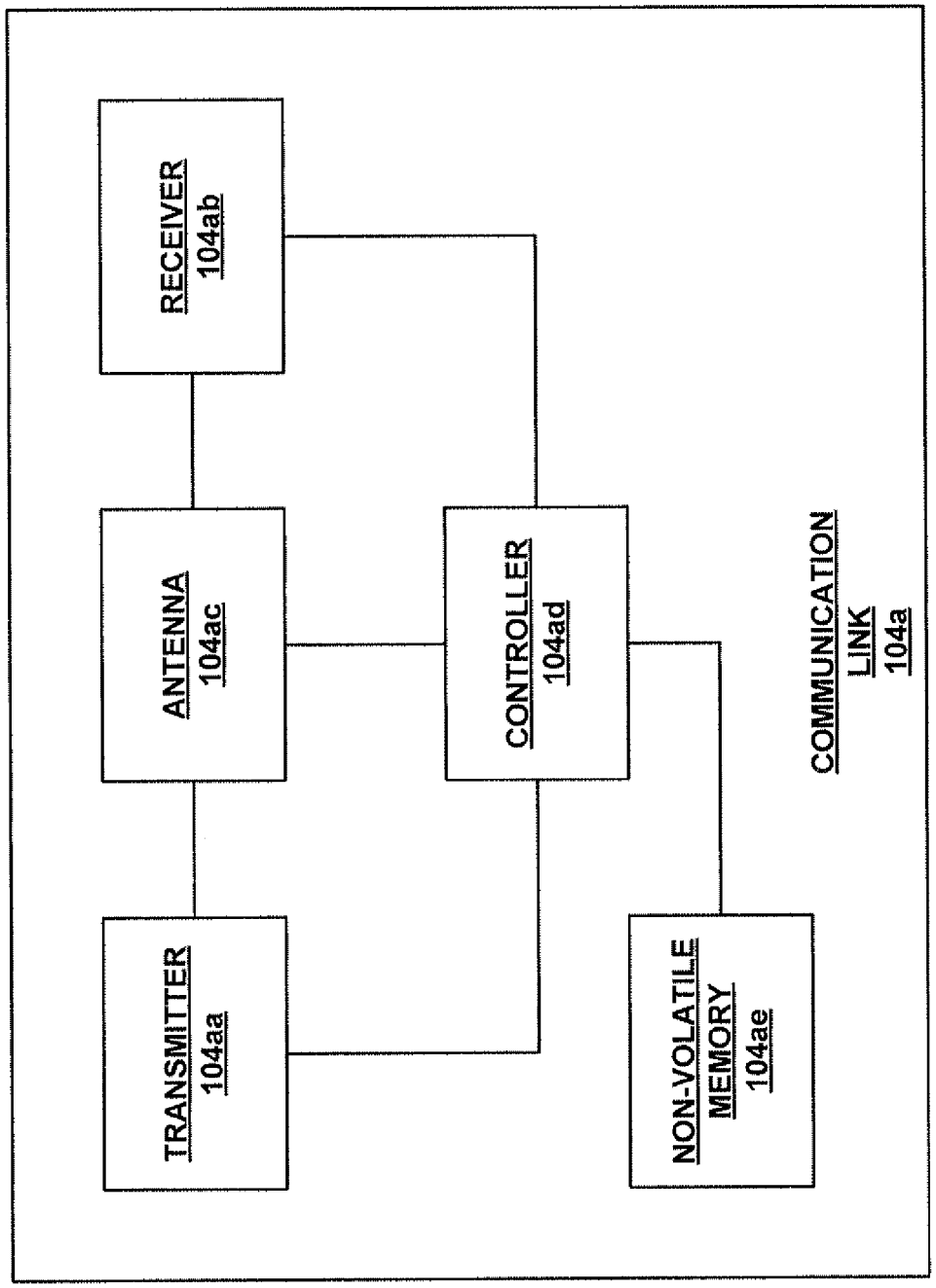
FIG. 3d is a schematic illustration of an exemplary embodiment of the communication link of the central controller of FIG. 3c.

In an exemplary embodiment, as illustrated in FIG. 3d, each communication link 104a includes a transmitter 104aa and a receiver 104ab that are each operably coupled to an antenna 104ac and a controller 104ad. In an exemplary embodiment, the controller 104ad is further coupled to a non-volatile member 104ae. In an exemplary embodiment, the transmitter 104aa, the receiver 104ab, and the antenna 104ac may be conventional. In an exemplary embodiment, the antenna 104ac may be a conventional directional antenna. In this manner, communication between the central controller 104 and the sensor nodes 102 may be implemented using SDM operating mode thereby preventing collisions between such communications. In an exemplary embodiment, the controller 104ad may be, for example, a conventional general purpose programmable controller and/or an application specific integrated circuit and/or an analog controller. In an exemplary embodiment, the non-volatile memory 104ae may be a conventional non-volatile memory device such as, for example, a flash memory or FAST RAM.

Figure 3E:
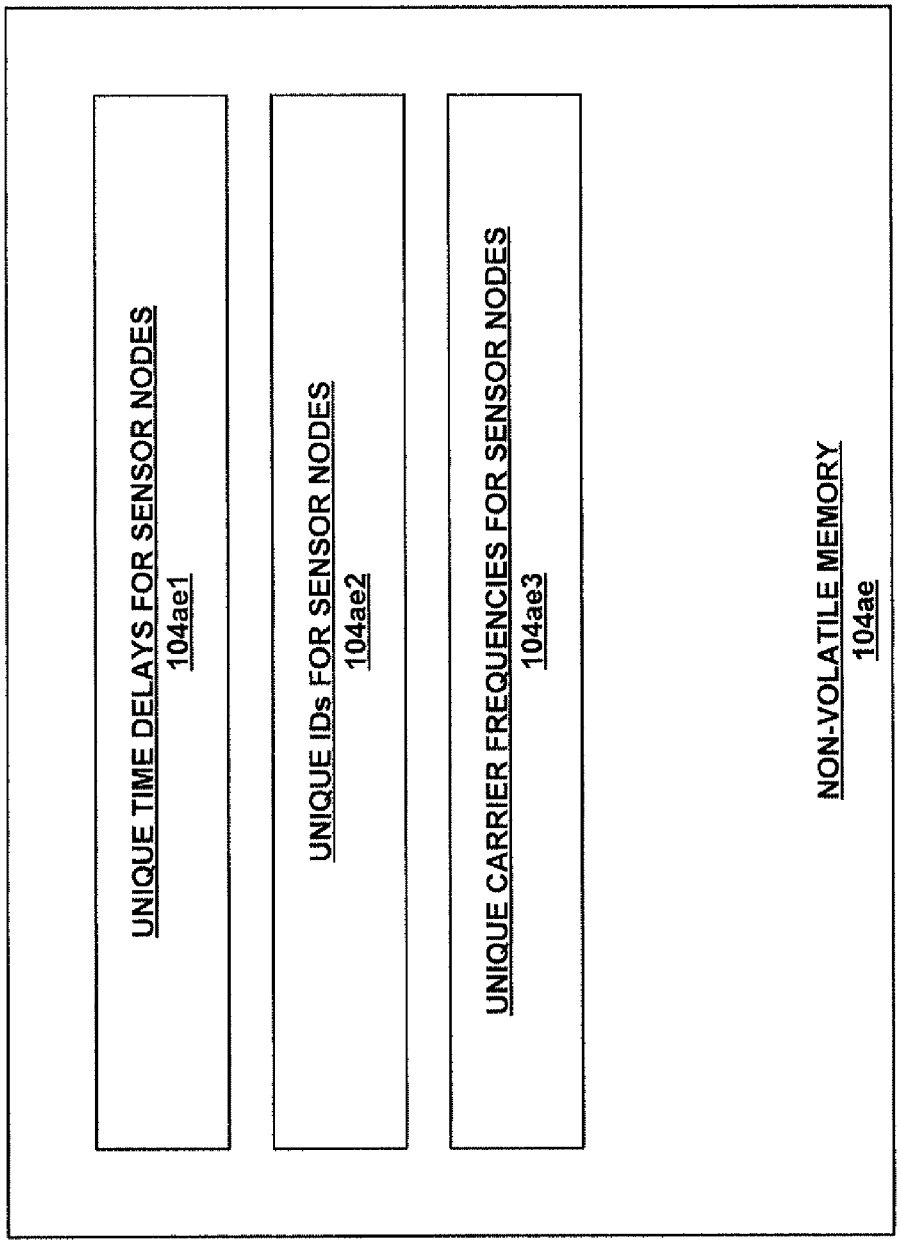
FIG. 3e is a schematic illustration of an exemplary embodiment of the non-volatile memory of the communication link of FIG. 3d.

In an exemplary embodiment, as illustrated in FIG. 3eb, the non-volatile memory 104ae may include time delay records 104ae1 having values that are representative of unique time delays associated with the transmission of data from the sensor nodes 102 to one or more other sensor nodes and/or the central controller 104, unique IDs 104a2 associated with the sensor nodes, and unique carrier frequencies 104ae3 associated with the transmission of data from the sensor nodes 102 to one or more other sensor nodes and/or the central controller.

Thus, in an exemplary embodiment, communications within and among the elements of the system 100, such as the sensor nodes 102 and the central controller 104, may be implemented using a TDM, FDM, and/or SDM mode of operation. In an exemplary embodiment, the operational modes of the system 100, whether they include one or more of TDM, FDM and SDM, may be implemented in accordance with conventional communication protocols associated therewith.

Figure 4A:
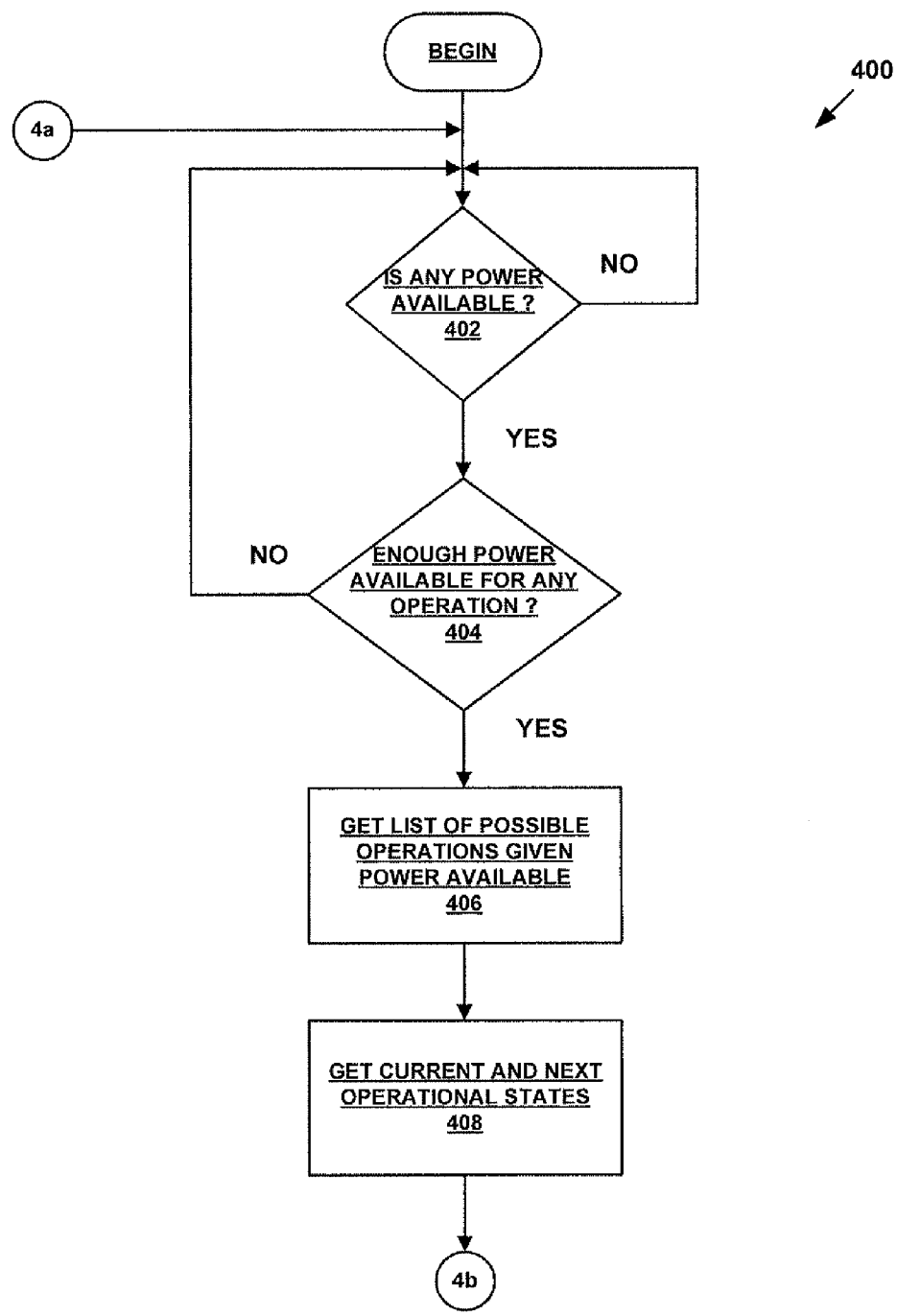
FIGS. 4a and 4b are flow chart illustrations of an exemplary embodiment of a method of operating the sensor nodes of FIG. 3.
Figure 4B:
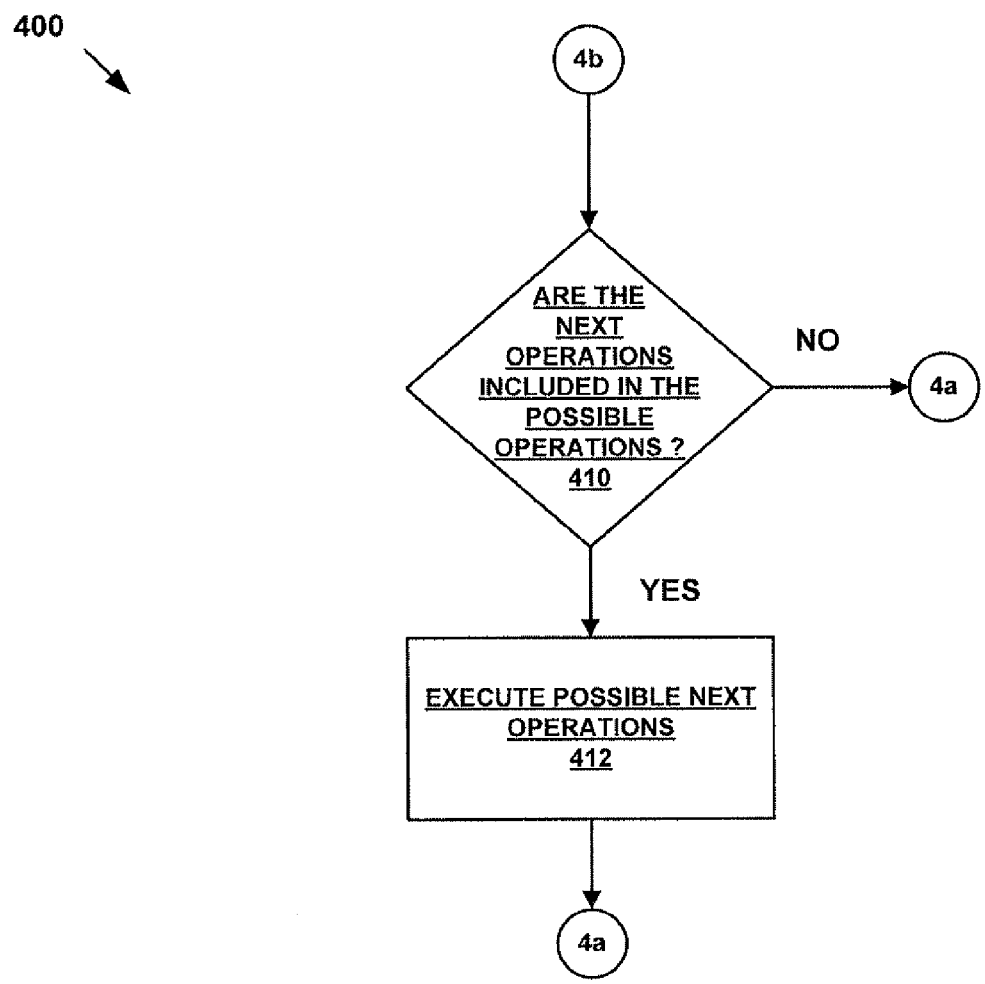

Referring now to FIGS. 4a and 4b, in an exemplary embodiment, one or more of the sensor nodes 102 of the system 100 implement a method 400 of operating in which, in 402, the sensor node determines if there is any power available to the sensor node. If there is any power available to the sensor node 102, then the sensor node determines if there is enough power available to the sensor node to permit the sensor node to execute at least one operation in 404.

If there is enough power available to permit the sensor node 102 to execute at least one operation, then the sensor gets a listing of the possible operations given the amount of available power in 406. The sensor node 102 then gets a listing of the current and next operational states for the sensor node in 408.

The sensor node 102 then determines if the next operational states of the sensor node are included in the possible operations given the amount of available power in 410. If the next operational states of the sensor node 102 are included in the possible operations given the amount of available power, then the sensor node executes the next operational states that are possible to execute given the amount of available power in 412.

Figure 5A:
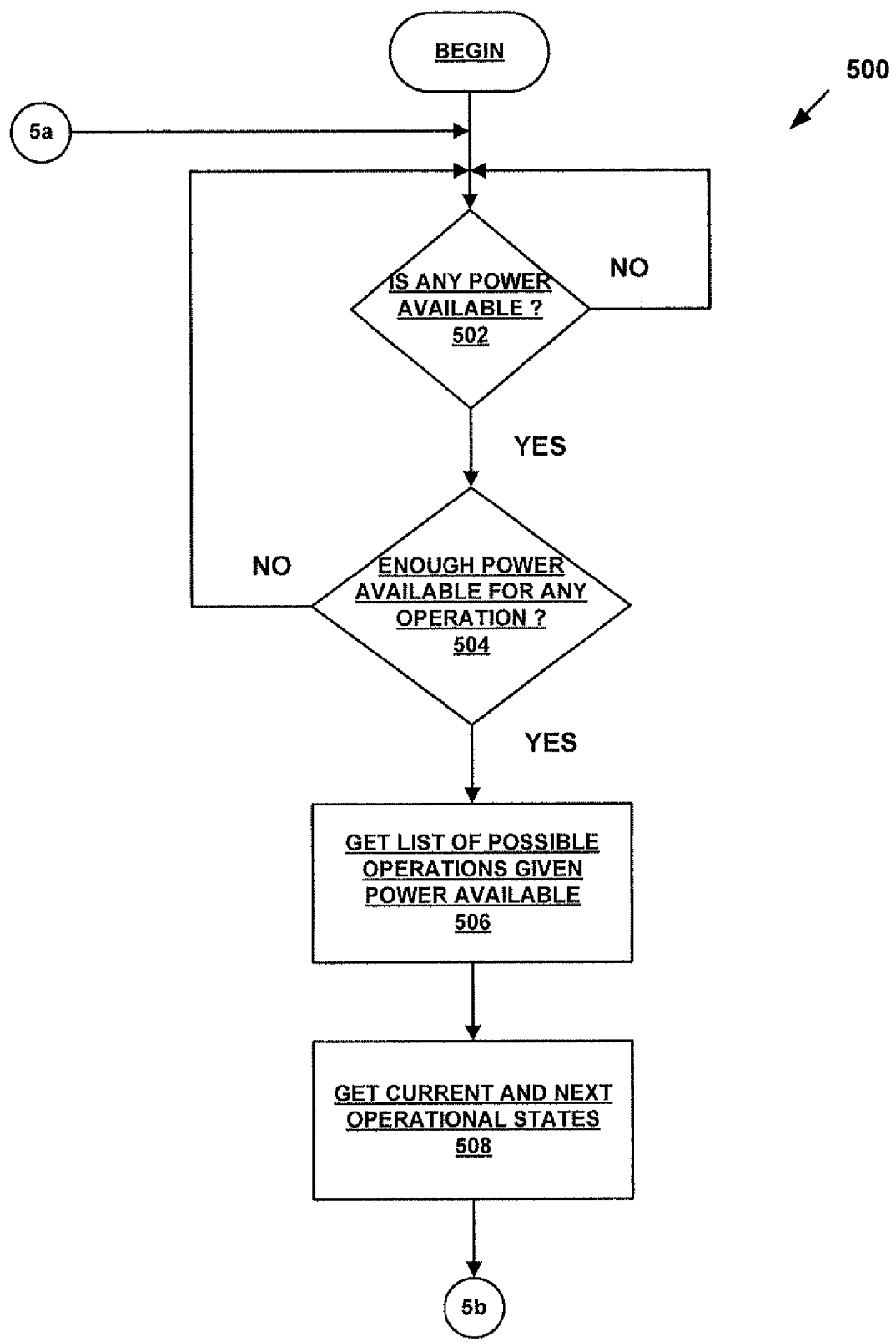
FIGS. 5a and 5b are flow chart illustrations of an exemplary embodiment of a method of operating the sensor nodes of FIG. 3.
Figure 5B:
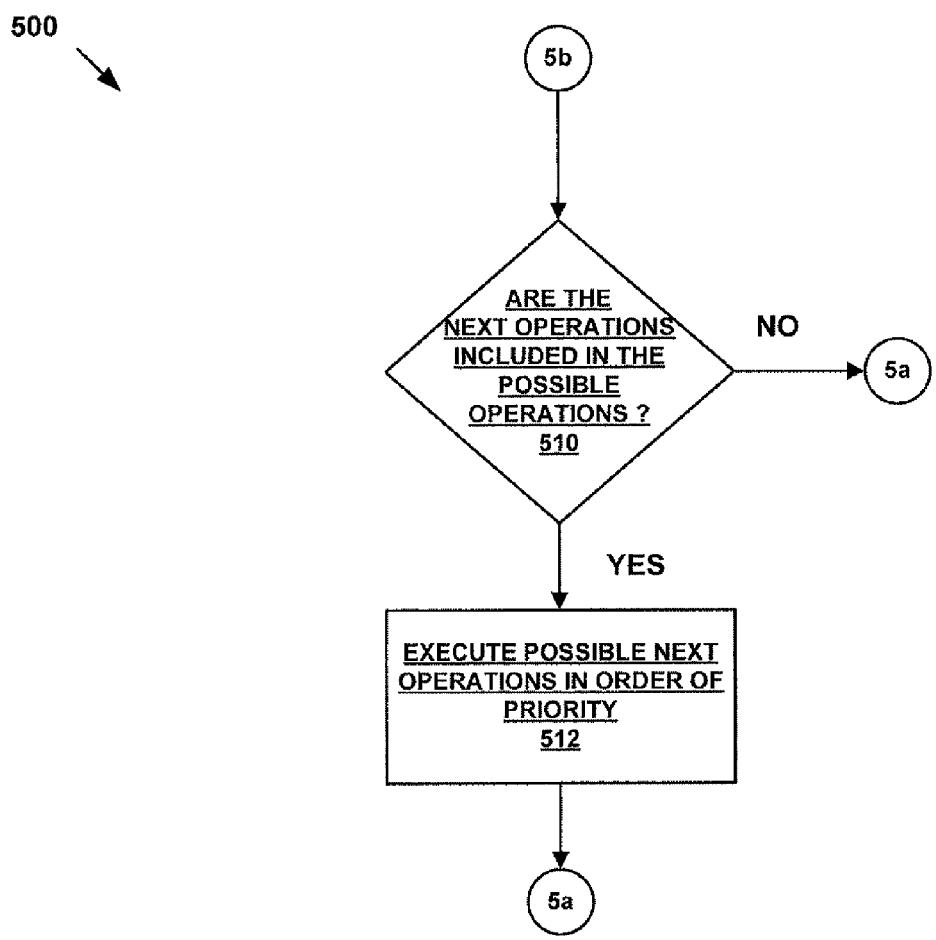

Referring now to FIGS. 5a and 5b, in an exemplary embodiment, one or more of the sensor nodes 102 of the system 100 implement a method 500 of operating in which, in 502, the sensor node determines if there is any power available to the sensor node. If there is any power available to the sensor node 102, then the sensor node determines if there is enough power available to the sensor node to permit the sensor node to execute at least one operation in 504.

If there is enough power available to permit the sensor node 102 to execute at least one operation, then the sensor gets a listing of the possible operations given the amount of available power in 506. The sensor node 102 then gets a listing of the current and next operational states for the sensor node in 508.

The sensor node 102 then determines if the next operational states of the sensor node are included in the possible operations given the amount of available power in 510. If the next operational states of the sensor node 102 are included in the possible operations given the amount of available power, then the sensor node executes the next operational states, based upon their pre-determined priority, that are possible to execute given the amount of available power in 512.

Figure 6:
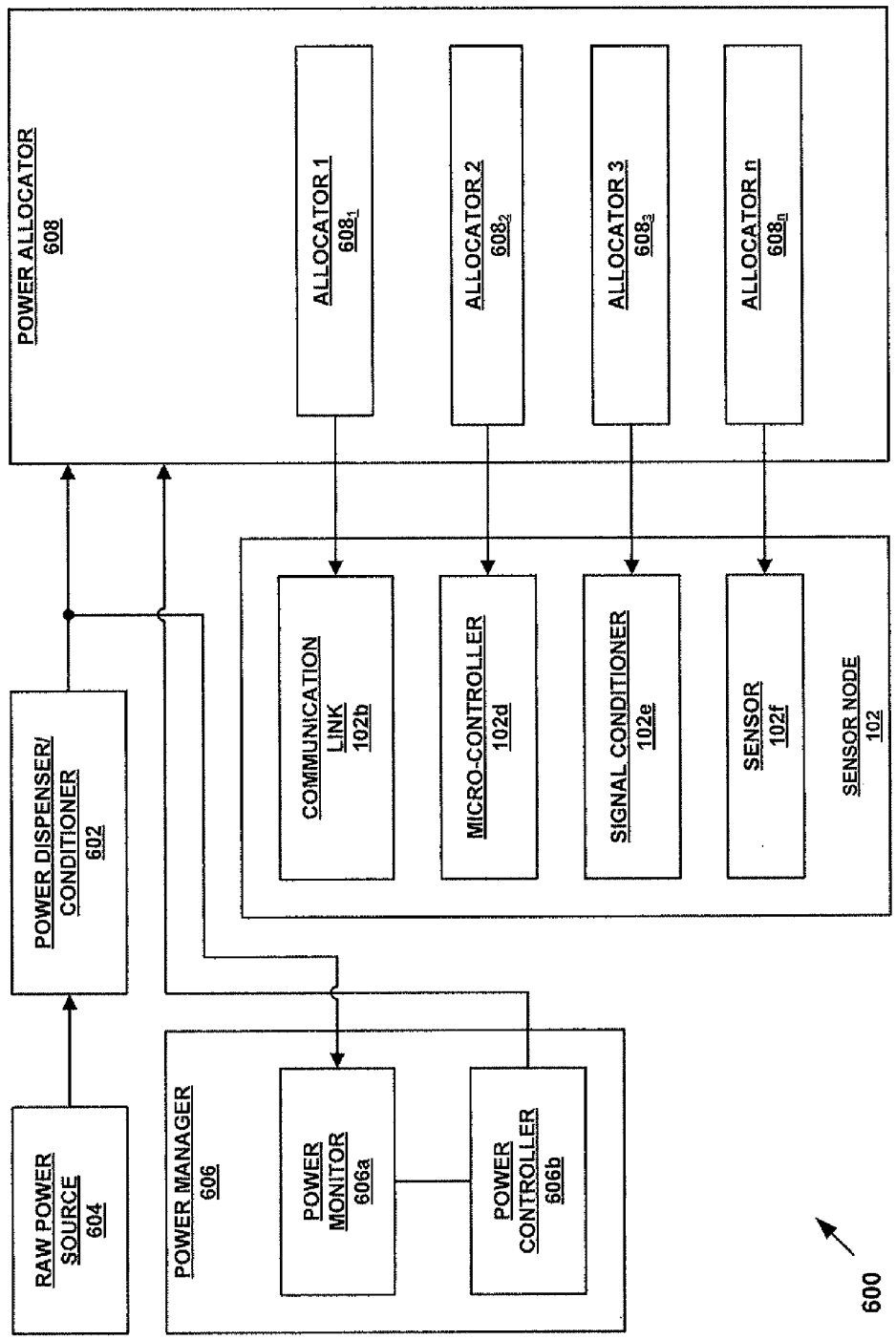
FIG. 6 is a schematic illustration of an exemplary embodiment of an aircraft monitoring system.

Referring now to FIG. 6, an exemplary embodiment of a system 600 for monitoring an aircraft is substantially identical in design and operation as the system 100 with the addition of a power dispenser and conditioner 602 that is operably coupled to a source of raw power 604, a power manager 606, a power allocator 608.

In an exemplary embodiment, the source of raw power 608 may include one or more of the power supplies 102a of one or more of the sensor nodes 102. In an exemplary embodiment, the power dispenser and conditioner 602 is adapted to receive time varying raw power, $P(t)_{raw}$, from the source of raw power 604, condition the raw power, and then transmit time varying available power, $P(t)_{avail}$, to the power allocator 608. In an exemplary embodiment, the power dispenser and conditioner 602 includes one or more elements for conditioning the raw power such as, for example, a rectifier and a filter.

In an exemplary embodiment, the power manager 606 includes a power monitor 606a and a power controller 606b. In an exemplary embodiment, the power monitor 606a is operably coupled to the output of the power dispenser and conditioner 602 for monitoring the available power, $P(t)_{avail}$. In an exemplary embodiment, the power monitor 606a is also operably coupled to the power controller 606b for communicating the available power, $P(t)_{avail}$, to the power controller. In an exemplary embodiment, the power controller 606b is also operably coupled to the power allocator 608 for controlling the operation of the power allocator.

In an exemplary embodiment, the power allocator 608 includes one or more allocators 608i that are each coupled to one or more elements of the sensor node 102 for controllably supplying power to the corresponding elements of the sensor node. In this manner, the power manager 606 and the power allocator 608 collectively determine the power available to the sensor node 102 and then allocate the available power to the elements of the sensor node.

In an exemplary embodiment, the system 600 may implement one or more aspects of the methods 400 and 500, described and illustrated above with reference to FIGS. 4a, 4b, 5a, and 5b. In an exemplary embodiment, the elements and functionality of the power dispenser and conditioner 602, the raw power source 604, the power manager 606, and the power allocator 608 may be provided within one or more of the sensor nodes 102 and/or provided within the central controller 104.

Figure 7:
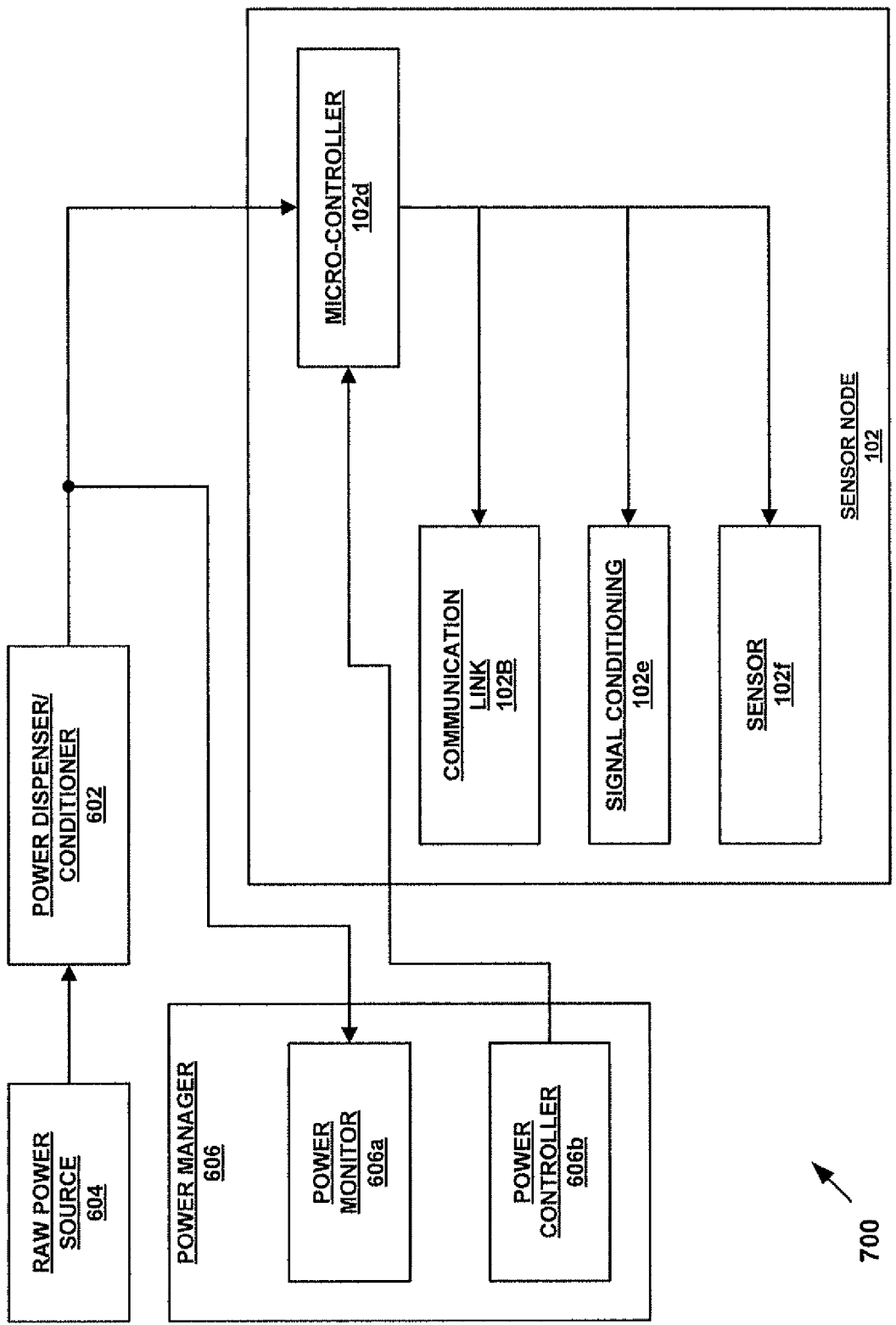
FIG. 7 is a schematic illustration of an exemplary embodiment of an aircraft monitoring system.

Referring now to FIG. 7, an exemplary embodiment of a system 700 for monitoring an aircraft is substantially identical in design and operation as the system 600 except that the power allocator 608 is omitted and the functionality formerly provided by the power allocator is provided by the micro-controller 102d within the sensor nodes 102.

In particular, in the system 700, the power controller 606b is operably coupled to the micro-controller 102d of the sensor node 102 for directing the allocation of the available power by the micro-controller to the elements of the sensor node.

In an exemplary embodiment, the system 700 may implement one or more aspects of the methods 400 and 500, described and illustrated above with reference to FIGS. 4a, 4b, 5a, and 5b. In an exemplary embodiment, the elements and functionality of the power dispenser and conditioner 602, the raw power source 604, and the power manager 606 may be provided within one or more of the sensor nodes 102 and/or provided within the central controller 104.

Figure 8:
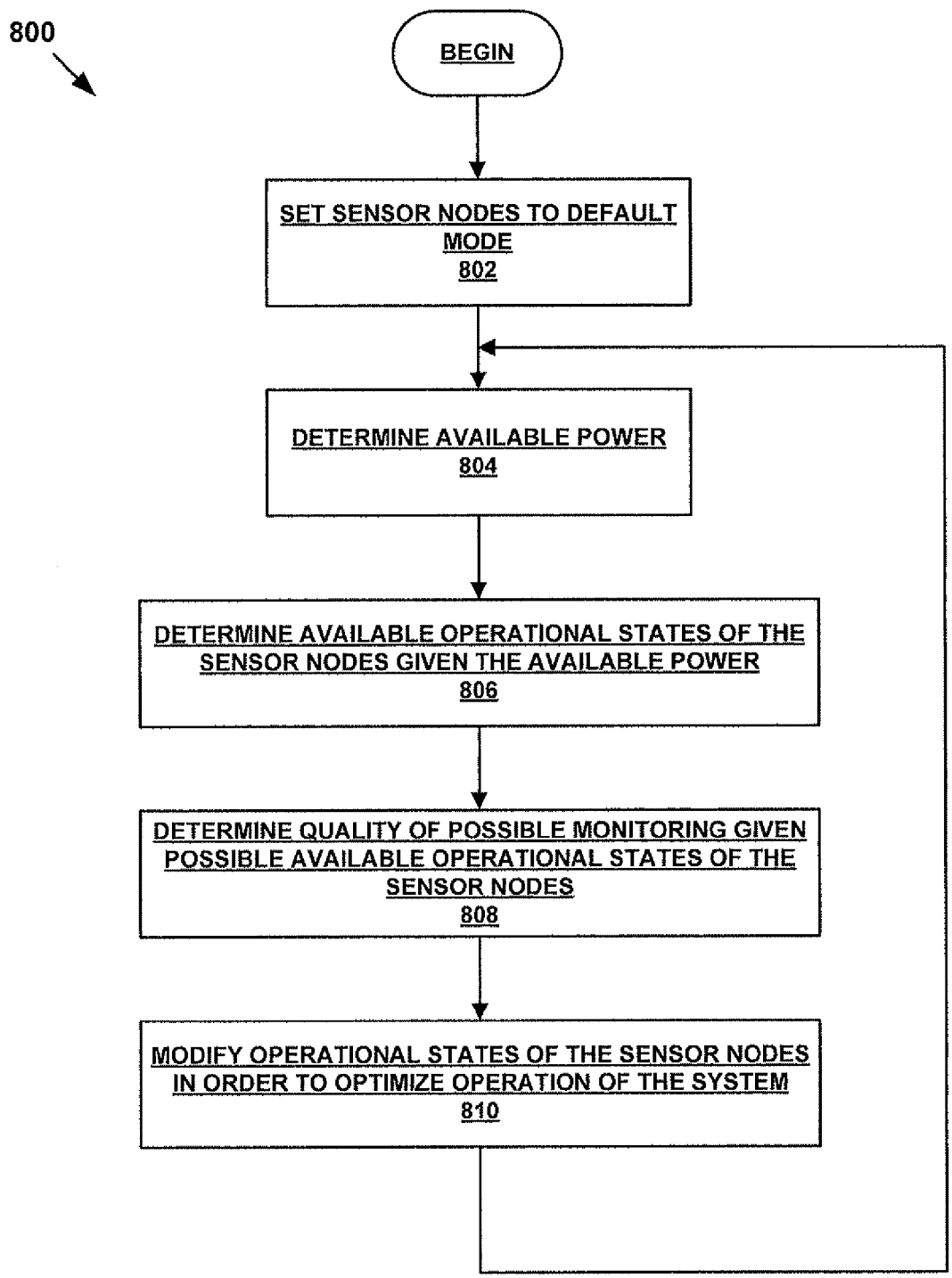
FIG. 8 is a flow chart illustration of a method of operating an aircraft monitoring system.

Referring now to FIG. 8, in an exemplary embodiment, one or more of the systems 100, 600, and 700 may implement a method 800 of operating in which, in 802, the sensor nodes 102 are placed into a default mode of operation which may, for example, include a sleep mode in which the sensor node is inactive, a fully active mode in which the sensor node is fully active, or one or more intermediate active modes in which the sensor node has functionality that is less than in the fully active mode. In 804, the system, 100, 600, or 700, will then determine the amount of power available to the system. In an exemplary embodiment, in 806, the system, 100, 600, or 700, will then determine the available operational states of the sensor nodes 102 of the system given the amount of power available to the system.

In an exemplary embodiment, in 808, the system, 100, 600, or 700, will then determine the quality of the possible monitoring of the aircraft 108 given the available operational states of the sensor nodes 102 of the system given the amount of power available to the system. In an exemplary embodiment, the quality of the possible monitoring of the aircraft 108 may be a function of what monitoring is adequate based upon the operating envelope and actual operating condition of the aircraft. For example, when the aircraft 108 is cruising at high altitudes with minimal turbulence, the level of detail and sampling rate in the monitored conditions may be less than when the aircraft is climbing to, or diving from, altitude with heavy turbulence.

In an exemplary embodiment, in 810, the system, 100, 600, or 700, will then modify the operational states of the sensor nodes 102 in order to optimize one or more of: 1) the available operational states of the sensor nodes, 2) the volume of data collected by the sensor nodes, 3) the sampling rate of the data collected by the sensor nodes, 4) the communication throughput of data within the network 106, and/or 5) the quality of the possible monitoring.

In an exemplary embodiment, during the operation of the systems, 100, 600 and/or 700, the switches, 102c, 102g and 102h, may be operated by the micro-controller 102d to place the sensor node 102 in a sleep mode by not permitting operation of the communication link 102b and the sensor 102f. In this manner, the use of power by the sensor node 102 is minimized.

In an exemplary embodiment, during the operation of the systems, 100, 600 and/or 700, the sensor node 102 may be operated in a sleep mode of operation that may, for example, include a range of sleeping mode that may vary from a deep sleep to a light sleep. In an exemplary embodiment, in a deep sleep mode of operation, the sensor node 102 may be completely asleep and then may be awakened by a watch dog timer, or other alert. In an exemplary embodiment, in a light sleep mode of operation, some of the functionality of the sensor node 102 may be reduced. In an exemplary embodiment, in one or more intermediate sleeping modes of operation, the functionality of the sensor node 102 will range from a standby mode, to a light sleep, to a deep sleep.

In an exemplary embodiment, in one or more of the systems 100, 600 and 700, one or more of the elements and functionality of the power dispenser and conditioner 602, the raw power source 604, the power manager 606, and the power allocator 608 may be provided within a sensor node 102, within one or more groups of sensor nodes, and/or within the central controller 104.

In an exemplary embodiment, in one or more of the systems, 100, 600 and 700, one or more of the elements and functionality of the raw power source 604 may be provided within a single sensor node 102, within one or more groups of sensor nodes, or by all of the sensor nodes. For example, if the power supply 102a in each of the sensor nodes 102 within one of the systems, 100, 600 or 700, is a solar cell, then the level of solar energy at each sensor node 102 will vary as a function of its location on the aircraft 108. In an exemplary embodiment, the allocation of power within the sensor nodes 102 of the systems, 100, 600 and 700, will determine the mapping of the power generated by the sensor nodes and then allocate power among the sensor nodes in order to optimize the operation of the systems in monitoring the aircraft 108.

In an exemplary embodiment, in one or more of the systems 100, 600 and 700, one or more of the sensor nodes 102 may provide one or more of the elements and functionality of the central controller 104.

In an exemplary embodiment, one or more of the systems 100, 600 and 700, may be operated to provide an optimal quality of the possible monitoring of the aircraft 108 by placing one or more determined sensor nodes 102 into a sleep mode, even in the presence of adequate power to operate the determined sensor nodes if the systems determine that the optimal quality of the possible monitoring of the aircraft can still be achieved. In this manner, the determined sensor nodes 102 placed into a sleep mode may do one or more of: store power or store data within the determined sensor node. In this manner, data may be warehoused within a sensor node 102 for later use and/or power may be stored within the sensor node for later use.

In an exemplary embodiment, one or more of the systems 100, 600 and 700, may be operated to place one or more determined sensor nodes 102 into a sleep mode if the data for the determined sensor node may be extrapolated using the data available for adjacent sensor nodes.

Figure 9A:
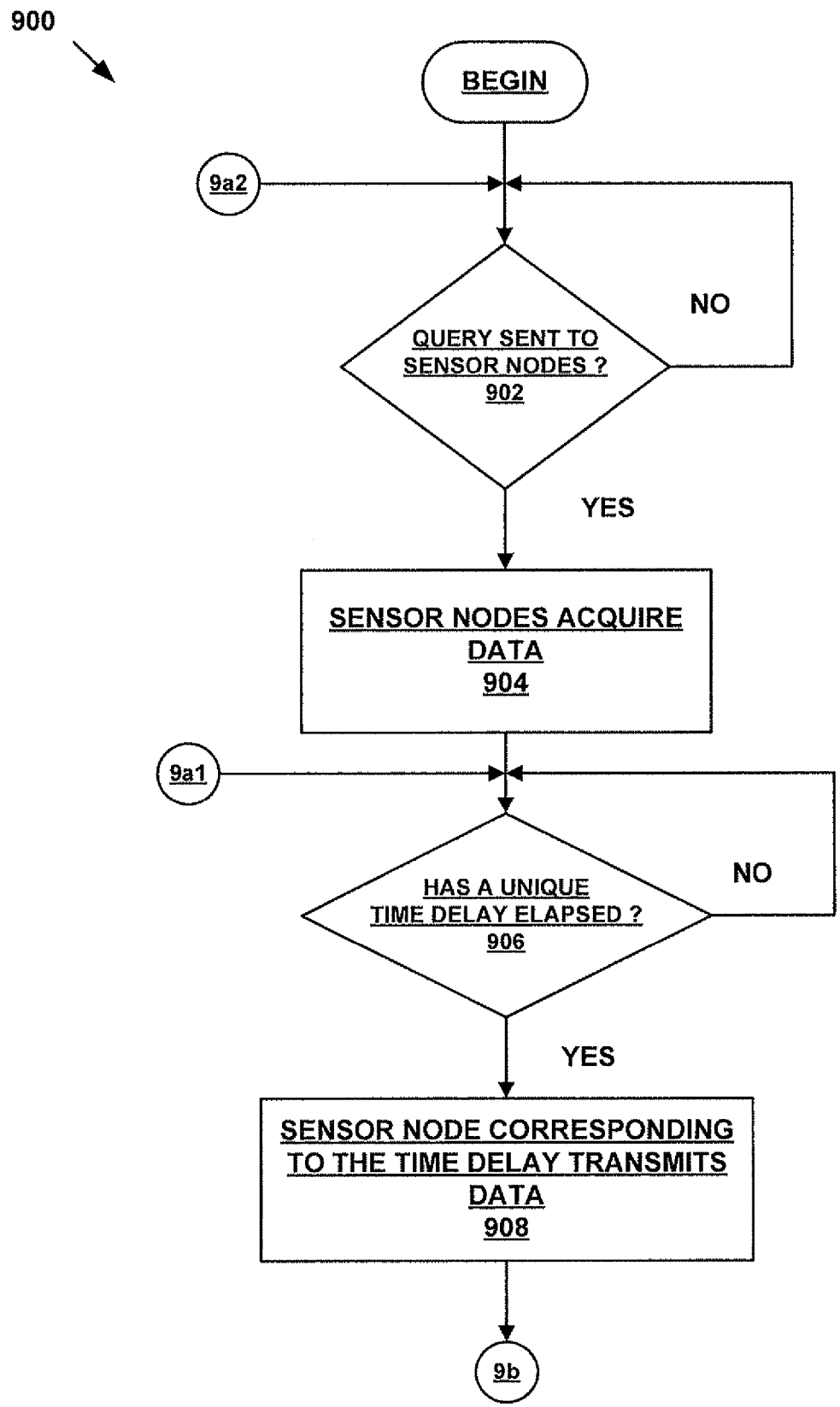
FIGS. 9a and 9b are flow chart illustration of an exemplary embodiment of a method of communicating data from the sensor nodes to the central controller of the system of FIG. 1.
Figure 9B:
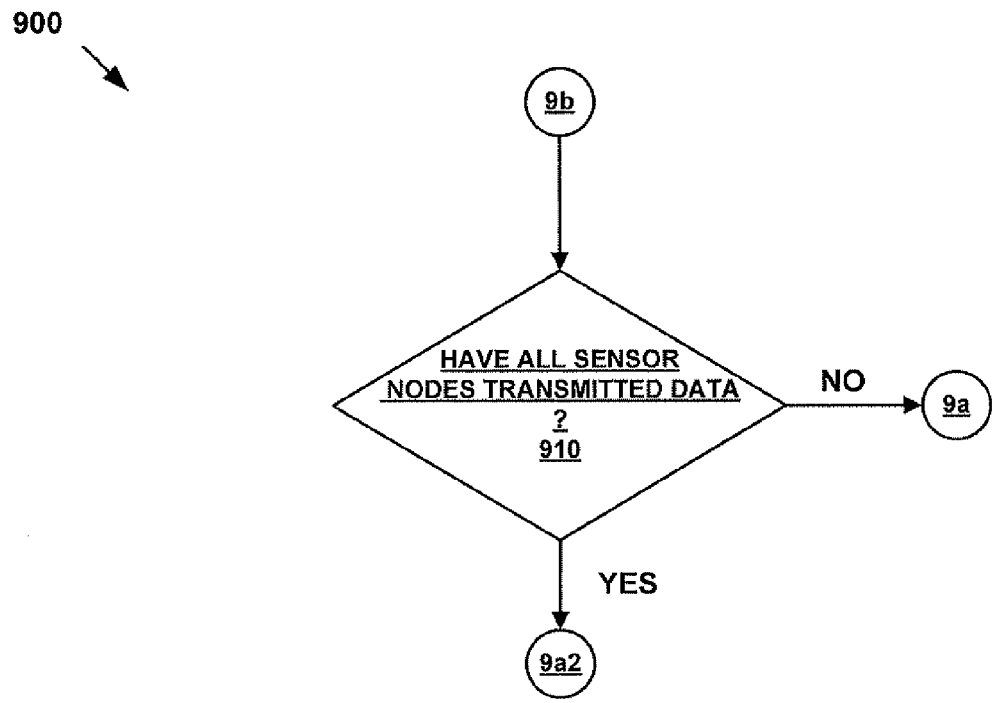

Referring now to FIGS. 9a and 9b, in an exemplary embodiment, during operation of the system, 100, 600 and/or 700, the system implements a method 900 of communication in which, in 902, the central controller 104 transmits a query to the sensor nodes 102 of the system. In 904, the sensor nodes 102 that receive the query from the central controller 104 then acquire data. In 906, if a unique elapsed time 102be1 associated with a sensor has elapsed, then the corresponding sensor will transmit the acquired data to the central controller 104 in 908. If not all of the sensor nodes 102 have transmitted their acquired data in 910, then the central controller 104 will continue to await further transmissions of acquired data as more time elapses.

Thus, the method 900 provides a TDM communication system. In an exemplary embodiment, one or more of the antennas, 102bc and 104ac, of the sensor nodes 102 and central controller 104, respectively, may be directional antennas. Thus, in an exemplary embodiment, operation of the method 900 may also provide a combination of TDM and SDM communication system.

Figure 10:
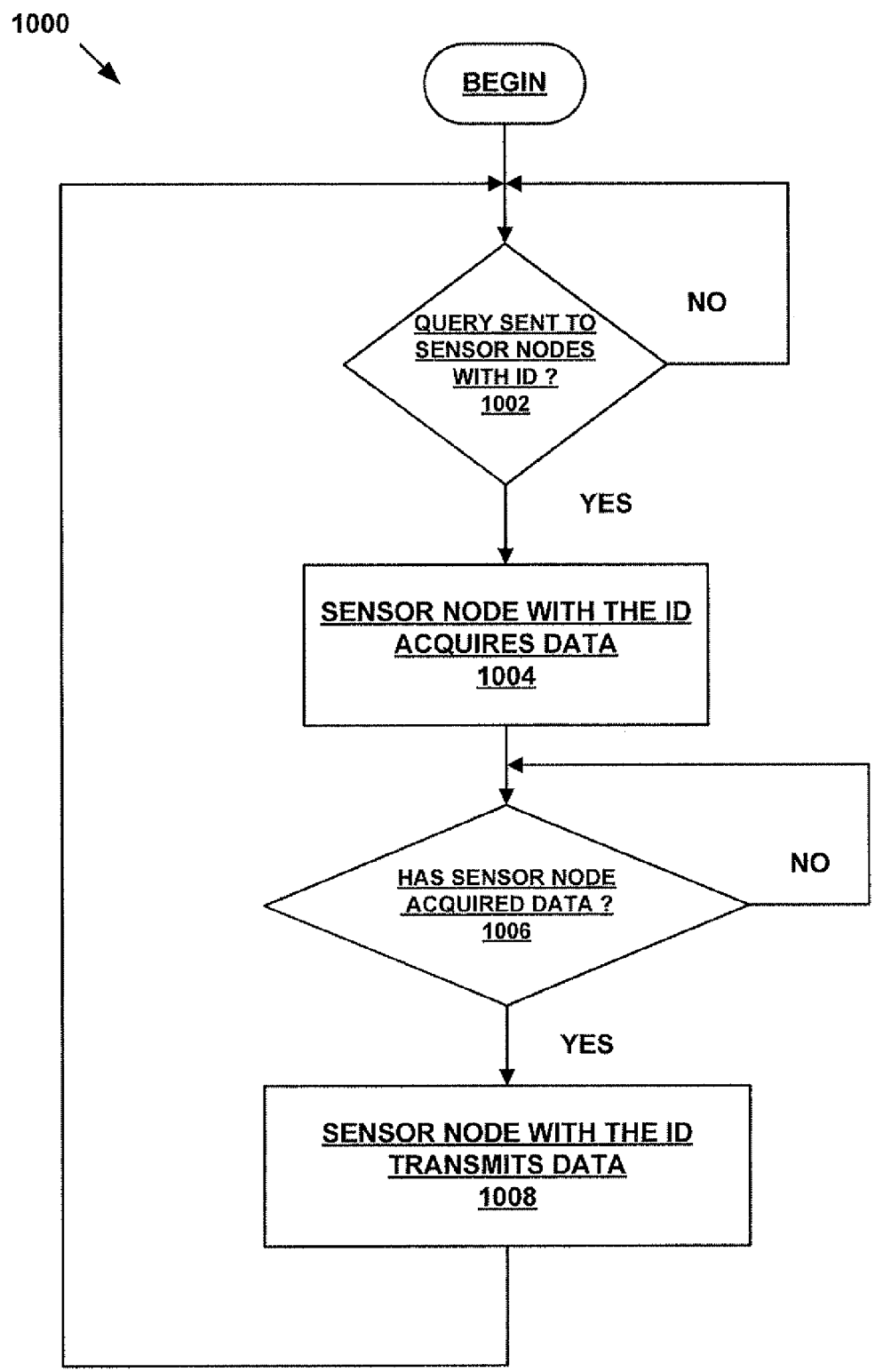
FIG. 10 is a flow chart illustration of an exemplary embodiment of a method of communicating data from the sensor nodes to the central controller of the system of FIG. 1.

Referring now to FIG. 10, in an exemplary embodiment, during operation of the system, 100, 600 and/or 700, the system implements a method 1000 of communication in which, in 1002, the central controller 104 transmits a query to the sensor nodes 102 of the system that include a sensor node ID. In 1004, the sensor node 102 having an ID 102be2 that matches the sensor node ID in the query from the central controller 104 then acquires data. In 1006, if the sensor node 102 having the sensor node ID in the query from the central controller 102 has completed the acquisition of the data, then the corresponding sensor will transmit the acquired data to the central controller in 1008.

Thus, the method 1000 provides a communication system that permits the acquisition of data from sensor nodes 102 by the central controller 104 that avoids data collisions. In an exemplary embodiment, one or more of the antennas, 102bc and 104ac, of the sensor nodes 102 and central controller 104, respectively, may be directional antennas. Thus, in an exemplary embodiment, operation of the method 1000 may also provide a SDM communication system.

Figure 11:
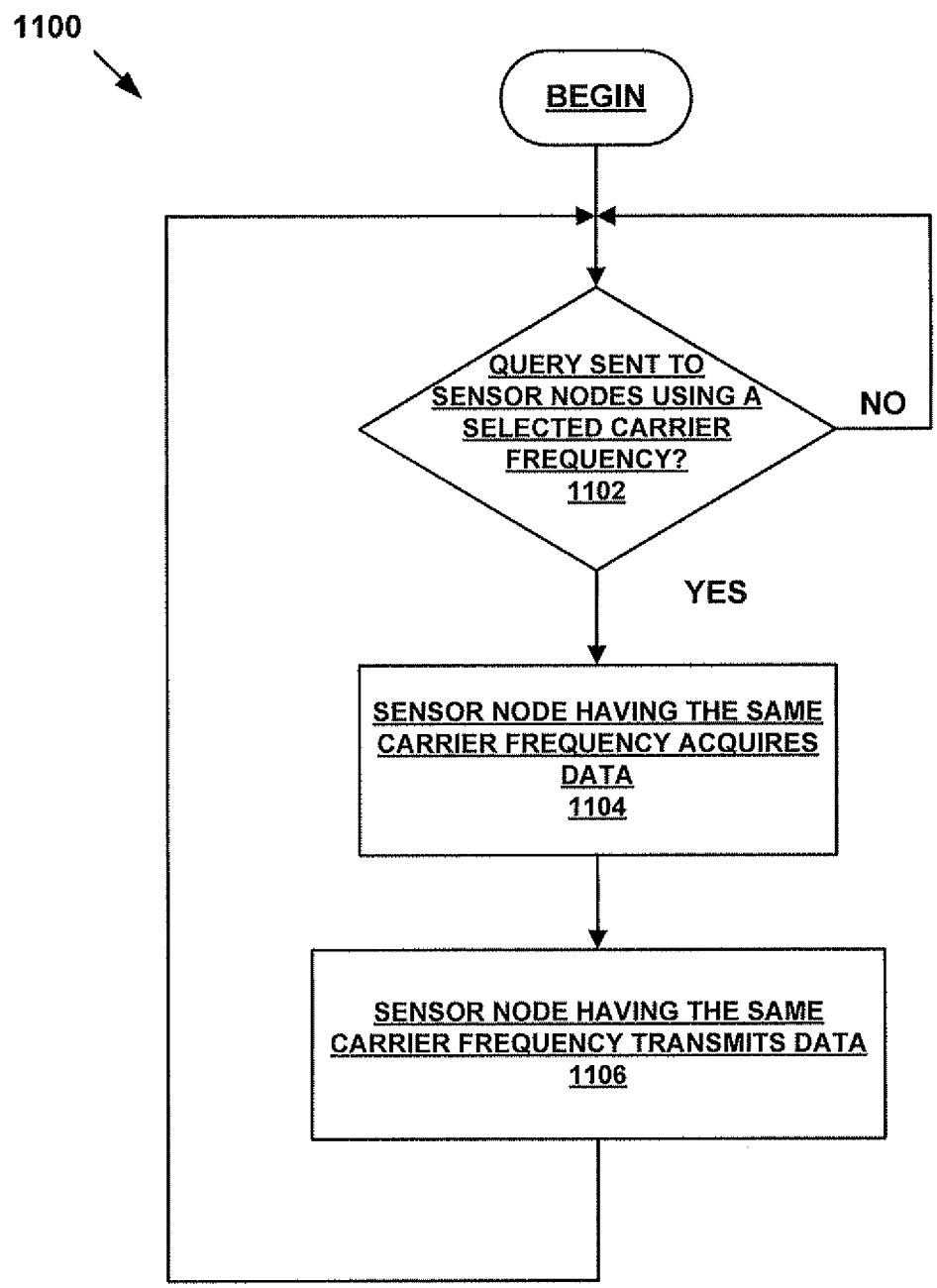
FIG. 11 is a flow chart illustration of an exemplary embodiment of a method of communicating data from the sensor nodes to the central controller of the system of FIG. 1.

Referring now to FIG. 11, in an exemplary embodiment, during operation of the system, 100, 600 and/or 700, the system implements a method 1100 of communication in which, in 1102, the central controller 104 transmits a query to the sensor nodes 102 of the system having a center frequency. In 1104, the sensor node 102 having a center frequency 102be3 that matches the center frequency of the query from the central controller 104 then acquires data. In 1106, if the sensor node 102 has completed the acquisition of the data, then the corresponding sensor node will transmit the acquired data to the central controller in 1106 using a signal having the same center frequency as that used in the query from the central controller 104.

Thus, the method 1100 provides a communication system that permits the acquisition of data from sensor nodes 102 by the central controller 104 using a FDM communication system. In an exemplary embodiment, one or more of the antennas, 102bc and 104ac, of the sensor nodes 102 and central controller 104, respectively, may be directional antennas.

Thus, in an exemplary embodiment, operation of the method 1100 may also provide a combination of a FDM and SDM communication system.

In an exemplary embodiment, the systems 100, 600 and/or 700, may implement a communication system that may include one or more of TDM, FDM and SDM. As a result, communication of data within the systems, 100, 600 and 700, may be effectuated while avoiding collisions between signals. Furthermore, the teachings of the exemplary embodiments may also permit the systems 100, 600 and/or 700, to singlecast and/or multicast queries for data from the central controller 104 to the sensor nodes 102.

In an exemplary embodiment, the systems 100, 600 and/or 700, may implement a communication system that may include one or more of TDM, FDM and SDM in which one or more of the time slots, the center frequencies, and/or the geometric space allotted to the communication pathway shift during operation according to a predetermined schedule and/or on a random basis.

Figure 12:
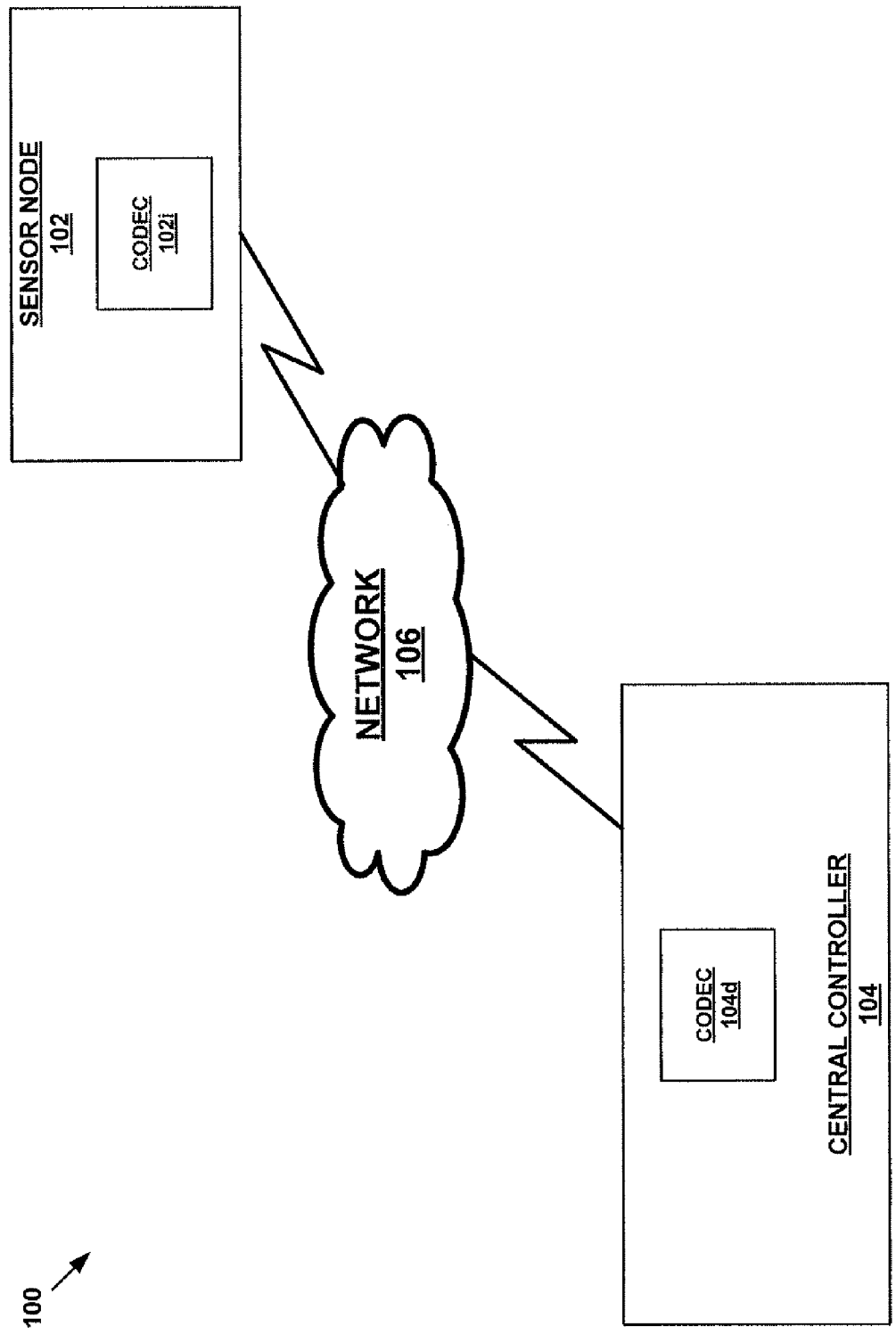
FIG. 12 is a schematic illustration of an exemplary embodiment of an aircraft monitoring system in which the central controller and the sensor nodes include codecs for controlling and implementing the communication protocol.
Figure 13:
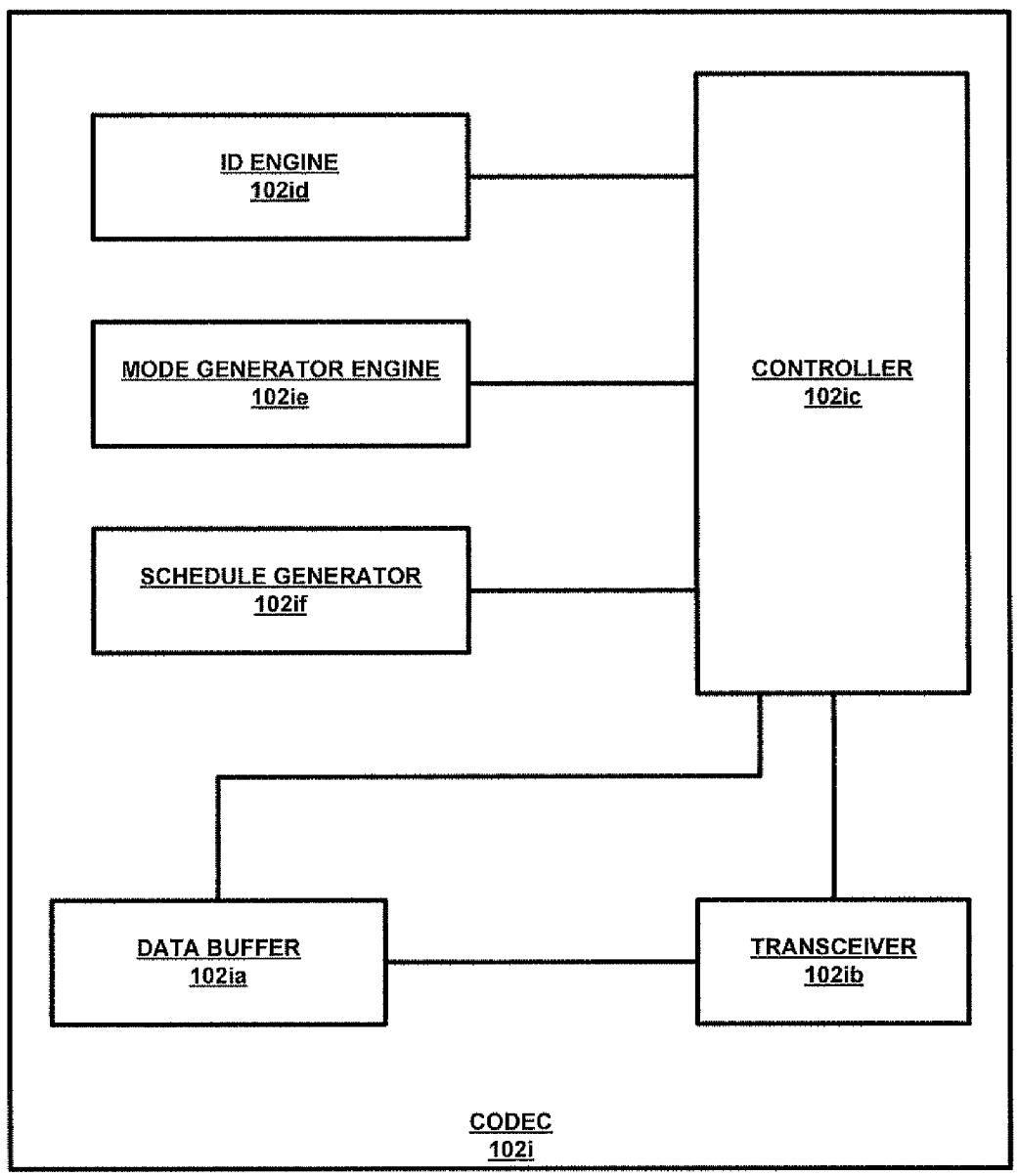
FIG. 13 is a schematic illustration of an exemplary embodiment of the codec of the central controller of the aircraft monitoring system of FIG. 12.
Figure 14:
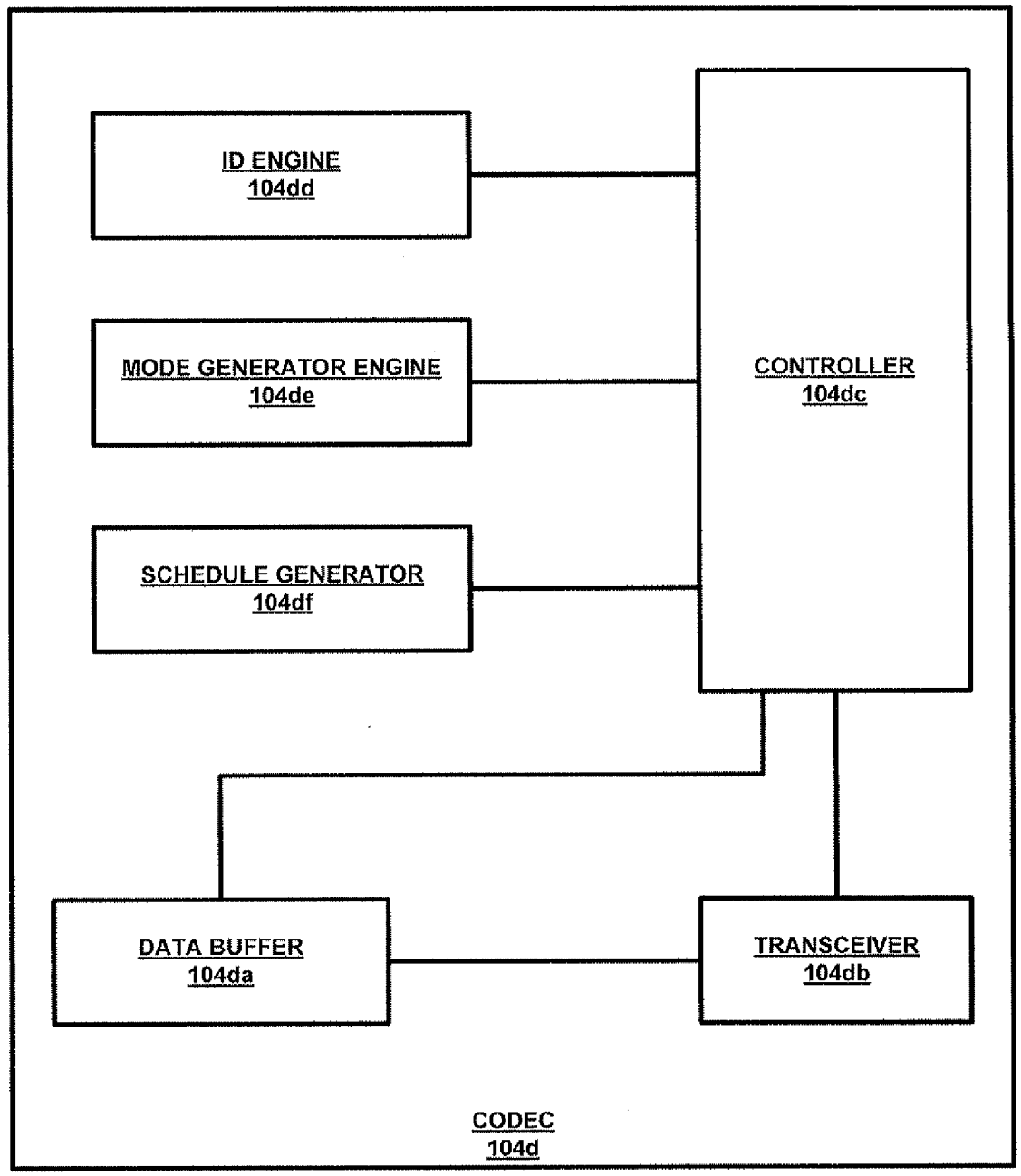
FIG. 14 is a schematic illustration of an exemplary embodiment of the codec of the sensor nodes of the aircraft monitoring system of FIG. 12.

Referring now to FIGS. 12-14, in an exemplary embodiment, the sensor nodes 102 of the system 100 include a codec 102i and the central controllers 104 of the system 100 include a codec 104d.

In an exemplary embodiment, the codec 102i includes a data buffer 102ia for buffering data transmitted to or from the sensor node 102 after reception or prior to transmission that is operably coupled to a transceiver 102ib. A controller 102ic is operably coupled to the data buffer 102ia and the transceiver 102ib for monitoring and controlling the operation of each. An ID engine 102id, a mode generator engine 102ie, and a schedule generator 102if are operably coupled to the controller 102ic. In an exemplary embodiment, the ID engine 102id generates and maintains a database of IDs for the sensor nodes 102 and the central controllers 104. In an exemplary embodiment, the mode generator engine 102ie provides either a fixed or a schedule of operating modes for the transceiver 102ib that may, for example, include one or more of TDM, FDM and SDM. In an exemplary embodiment, the schedule generator 102if provides a schedule of values for one or more of the time delay, the center frequency, and/or the directional antenna to be used during the operation of the transceiver 102idb.

In an exemplary embodiment, the codec 104d includes a data buffer 104da for buffering data transmitted to or from the central controller 104 after reception or prior to transmission that is operably coupled to a transceiver 104db. A controller 104dc is operably coupled to the data buffer 104da and the transceiver 104db for monitoring and controlling the operation of each. An ID engine 104dd, a mode generator engine 104de, and a schedule generator 104df are operably coupled to the controller 104dc. In an exemplary embodiment, the ID engine 104dd generates and maintains a database of IDs for the sensor nodes 102 and the central controllers 104. In an exemplary embodiment, the mode generator engine 104de provides either a fixed or a schedule of operating modes for the transceiver 104db that may, for example, include one or more of TDM, FDM and SDM. In an exemplary embodiment, the schedule generator 104df provides a schedule of values for one or more of the time delay, the center frequency, and/or the directional antenna to be used during the operation of the transceiver 104db.

In an exemplary embodiment, during operation of the system of FIGS. 12-14, the communication between the sensor nodes 102 and the central controllers 104 include an initial handshaking during which the sensor nodes and central controllers determine the communication protocol to be used using, for example, an arbitration process, or a preset determination that the sensor nodes or the central controller will determines the communication protocol to be used. Following the completion of the handshaking process, the sensor nodes 102 and the central controllers 104 may then communicate.

In an exemplary embodiment, one or more aspects of the system 100 of FIGS. 12-14 may also be implemented in the systems 600 and 700.

It is understood that variations may be made in the above without departing from the scope of the invention. While specific embodiments have been shown and described, modifications can be made by one skilled in the art without departing from the spirit or teaching of this invention. The embodiments as described are exemplary only and are not limiting. One or more elements of the exemplary embodiments may be combined, in whole or in part, with one or more elements of one or more of the other exemplary embodiments. Many variations and modifications are possible and are within the scope of the invention. Accordingly, the scope of protection is not limited to the embodiments described, but is only limited by the claims that follow, the scope of which shall include all equivalents of the subject matter of the claims.

The invention claimed is:

1. A distributed monitoring system for monitoring one or more operating conditions of an aircraft structure, comprising:
a plurality of sensor nodes coupled to an aircraft structure, each sensor node comprising:
a power supply positioned to scavenge energy from an immediate environment in which the aircraft structure is located during operational employment of the structure;
a sensor operably coupled to the power supply for sensing one or more operating conditions of the aircraft structure in the immediate environment; and
a sensor communications interface operably coupled to the power supply to utilize the scavenged energy and to the sensor for communicating the sensed operating conditions of the aircraft structure, the communications interface comprising a memory containing a plurality of sensor node communication protocol attributes, the sensor node communication protocol attributes including a fixed center frequency for communicating sensed operating conditions from the sensor node and a fixed time delay for communicating the sensed operating conditions from the sensor node, the fixed center frequency being the same center frequency as that of at least one other of the plurality of sensor nodes and different than at least one other of the plurality of sensor nodes, the fixed frequency being unique for each sensor node having a same time delay to prevent collisions between sensor nodes having the same time delay, the fixed time delay being unique for each sensor node having the same center frequency to prevent collisions between the sensor nodes having the same center frequency;
a communication network operably coupled to the sensor nodes; and
a central controller housed within the aircraft structure and operably coupled to the communication network for monitoring the sensor nodes, the controller comprising a controller communications interface comprising a memory containing one or more controller communication protocol attributes, the controller further configured an initial handshake with the sensor nodes to receive or exchange data to acquire or to provide both the fixed center frequency and fixed time delay communication protocol attributes to be used between the controller and each of the respective plurality of sensor nodes to communicate sensed operating conditions to the controller.

2. The system of claim 1, wherein the sensor node communication protocol attributes further comprise a unique identifier for the sensor node.

3. The system of claim 1,
wherein the sensor communications interface of at least some of the sensor nodes comprises a plurality of directional antenna to further provide space division multiplexing;
wherein the controller communications interface comprises a plurality of directional antennas to receive data therefrom; and
wherein the controller further comprises a receiver and a schedule generator configured to identify the directional antenna to be used during operation of the receiver.

4. The system of claim 1, wherein the controller communication protocol attributes comprise the fixed center frequencies for communicating with and receiving information from the sensor nodes and the fixed time delays for receiving information from the sensor nodes, and wherein the controller is configured to transmit a sensor information query to each of the plurality of sensor nodes, and to await receipt of the sensor information separately from each of the sensor nodes receiving the sensor information query, the fixed time delays determined by the controller and provided to the respective sensor nodes as part of the initial handshake.

5. The system of claim 4, wherein the controller communication protocol attributes comprise unique identifiers for the sensor nodes.

6. The system of claim 1, wherein the central controller includes a transceiver, a controller operably coupled to the transceiver, an identification (ID) generator for generating and maintaining a database of IDs for each of the plurality of sensor nodes, and a schedule generator providing the fixed center frequency and fixed time delay of each sensor node of the plurality of sensor nodes.

7. The system of claim 1, wherein each sensor node is configured to communicate with the controller during the initial handshake such that each of the plurality of sensor nodes and the controller collectively determine the respective communication protocol attributes to be used via an arbitration process.

8. The system of claim 1, wherein the aircraft structure comprises an aircraft fuselage.

9. The system of claim 1, wherein the controller communication protocol attributes comprise each of the following:
the fixed time delays for receiving information from the sensor nodes;
unique identifiers for the sensor nodes; and
the fixed center frequencies for communicating with the sensor nodes.

10. The system of claim 9, wherein the fixed time delays and the fixed center frequencies are assigned by the controller during the initial handshake.

11. The system of claim 9, wherein the fixed time delays and the fixed center frequencies are assigned during the initial handshake as part of an arbitration process.

12. The system of claim 9, wherein the fixed time delays and the fixed center frequencies are assigned during the initial handshake according to a preset determination that the controller or the sensor nodes will determine the fixed center frequency to be used during the initial handshake between the controller and each respective sensor nodes.

13. The system of claim 3, wherein the controller communications interface comprises a plurality of directional antennas to further provide space division multiplexing.

14. The system of claim 13, wherein the sensor directional antenna to be employed for communicating information from one or more of the plurality of sensor nodes varies during operation of the system.

15. The system of claim 14, wherein the directional antenna to be employed for communicating information from the one or more sensor nodes varies during operation of the system according to a predetermined variance schedule.

16. A method of operating a system for monitoring one or more operating conditions of an aircraft structure, comprising:
providing power at a plurality of sensor nodes located around an aircraft structure through operational employment of the structure, the nodes configured to scavenge energy from an immediate environment in which the structure is located during operational employment of the structure;
storing sensor node communication protocol attributes within each of the sensor nodes, the communication protocol attributes including a fixed center frequency and a fixed time delay, the fixed frequency being unique for each sensor node having a same time delay to prevent collisions between sensor nodes having the same time delay, the time delay being different among respective sensor nodes for each sensor node having a same fixed center frequency to prevent collisions between sensor nodes having the same time delay;
each sensor node using the power to sense one or more operating conditions of the aircraft structure at the sensor node;
performing an initial handshake with each of the sensor nodes to receive or exchange data to acquire or to provide both the fixed center frequency and fixed time delay protocol communication attributes to be used between the central controller and each of the respective plurality of sensor nodes;
transmitting a query to the plurality of sensor nodes from the central controller; and
in response to the query, each sensor node transmitting the sensed operating conditions from the respective sensor node to the central controller as a function of the sensor node communication attributes using scavenged energy to communicate sensed operating conditions to the controller.

17. The method of claim 16, wherein the sensor node communication protocol attributes further comprise a unique identifier for the sensor node.

18. The method of claim 16,
wherein transmitting the sensed operating conditions from the sensor nodes to the central controller comprises transmitting the sensed operating conditions from the plurality of sensor nodes to the central controller in a particular direction; and
wherein the method further comprises the step of generating a schedule to identify a directional antenna to be used during operation of a controller receiver.

19. The method of claim 16, wherein controller communication protocol attributes utilized by the central controller comprise the fixed center frequencies for communicating with and receiving sensed operating conditions from the sensor nodes and the fixed time delays for receiving sensed operating conditions from the sensor nodes, and wherein the method further comprises awaiting receipt of the sensor information separately from each of the sensor nodes receiving the query, the fixed time delays determined by the controller and provided to the sensor nodes as part of the initial handshake.

20. The method of claim 19, wherein the controller communication protocol attributes comprise unique identifiers for the sensor nodes.

21. The method of claim 18, wherein transmitting a query to the sensor nodes from a central controller comprises transmitting a query to the sensor nodes from the central controller in one or more particular directions.

22. The method of claim 16, wherein the aircraft structure comprises an aircraft fuselage.

23. The method of claim 16, wherein the central controller includes a transceiver, a controller operably coupled to the transceiver, an identification (ID) generator for generating and maintaining a database of IDs for each of the plurality of sensor nodes, and a schedule generator providing the fixed center frequency and fixed time delay of each sensor node of the plurality of sensor nodes.

24. The method of claim 16, wherein each sensor node is configured to communicate with the controller during the initial handshake such that each of the plurality of sensor nodes and the controller collectively determine the respective communication protocol attributes to be used via an arbitration process.

25. The method of claim 16, wherein the fixed time delays and the fixed center frequencies are assigned to each of the plurality of sensor nodes during the initial handshake.

26. The method of claim 16, wherein the fixed time delays and the fixed center frequencies are assigned during the initial handshake as part of an arbitration process.

27. The method of claim 16, wherein the fixed time delays and the fixed center frequencies are assigned during the initial handshake according to a preset determination that the controller or the sensor nodes will determine the fixed center frequency to be used during the initial handshake between the controller and each respective sensor nodes.

28. The method of claim 16, wherein transmitting the sensed operating conditions from the sensor nodes to the central controller comprises transmitting the sensed operating conditions from the plurality of sensor nodes to the central controller in one or more particular directions.

29. The method of claim 16, wherein transmitting the sensed operating conditions from the plurality of sensor nodes to the central controller comprises transmitting the sensed operating conditions from the plurality of sensor nodes to the central controller in different ones of the particular directions.

30. The method of claim 16, wherein transmitting the sensed operating conditions from the plurality of sensor nodes to the central controller comprises transmitting the sensed operating conditions from the plurality of sensor nodes to the central controller in different ones of the particular directions according to a predetermined schedule.

31. A sensor node for use in a distributed monitoring system for monitoring one or more operating conditions of an aircraft structure, comprising:
   a power supply positioned to scavenge energy from an immediate environment in which an aircraft structure is located during operational employment of the structure;
   a sensor operably coupled to the power supply for sensing one or more operating conditions of the aircraft structure in the immediate environment; and
   a sensor node communications interface operably coupled to the power supply to utilize the scavenged energy and to the sensor for communicating the sensed operating conditions of the aircraft structure, the communications interface comprising a memory containing one or more sensor node communication protocol attributes, and a plurality of directional antennae to provide for space division multiplexing,
   the sensor node communication protocol attributes including a fixed center frequency for communicating the sensed operating conditions from the sensor node, and a fixed time delay for communicating sensed operating conditions from the sensor node, the fixed center frequency being the same center frequency as that of at least one other of a plurality of other similarly configured sensor nodes and substantially different than at least one other of the plurality of sensor nodes, the fixed time delay being unique for each node having the same center frequency to prevent collisions between the other similarly configured sensor nodes having the same center frequency,
   the sensor node configured to communicate sensed operating conditions of the aircraft structure to a central controller housed within the aircraft structure, and to communicate with the central controller during an initial handshake such that the sensor node and each of the plurality of sensor nodes and the controller collectively acquire or provide both the fixed center frequency and fixed time delay communication protocol attributes to be used between the controller, the sensor node, and each of the plurality of other similarly configured sensor nodes via an arbitration process, the sensor node configured to transmit the sensed operating conditions to the central controller using the scavenged energy.

32. The sensor node of claim 31, wherein the sensor node communication protocol attributes further comprise a unique identifier for the sensor node.

33. The sensor node of claim 31, wherein the sensor node communication protocol attributes comprise each of the following:
   the fixed time delay for transmitting information from the sensor node;
   a unique identifier for the sensor node; and
   the fixed center frequency for communicating with the sensor node.

34. The sensor node of claim 31, wherein the directional antenna used for communicating information from the sensor node varies during operation of the system.

35. The sensor node of claim 34, wherein the directional antenna used for communicating information from the sensor node varies during operation of the system on a random basis.

36. The sensor node of claim 34, wherein the directional antenna used for communicating information from the sensor node varies during operation of the system according to a predetermined variance schedule.

* * * * *